(12) United States Patent
Perkins et al.

(10) Patent No.: US 11,198,825 B2
(45) Date of Patent: Dec. 14, 2021

(54) MONITORING OF HYDROPROCESSED FLUIDS BY OPTICAL SPECTROSCOPY

(71) Applicant: ExxonMobil Research and Engineering Company, Annandale, NJ (US)

(72) Inventors: David L. Perkins, Easton, PA (US); Jason M. McMullan, Nazareth, PA (US); Kendall S. Fruchey, Humble, TX (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 17/063,065

(22) Filed: Oct. 5, 2020

(65) Prior Publication Data
US 2021/0115344 A1    Apr. 22, 2021

Related U.S. Application Data

(60) Provisional application No. 62/923,806, filed on Oct. 21, 2019.

(51) Int. Cl.
*C10G 65/12*    (2006.01)
*C10G 67/06*    (2006.01)
(Continued)

(52) U.S. Cl.
CPC .............. *C10G 65/12* (2013.01); *C10G 67/06* (2013.01); *C10G 71/00* (2013.01); *G01N 21/64* (2013.01);
(Continued)

(58) Field of Classification Search
CPC ........ C10G 45/00–72; C10G 47/00–36; C10G 49/00–26; C10G 65/12; C10G 67/06; G01N 21/64
See application file for complete search history.

(56) References Cited

U.S. PATENT DOCUMENTS 3,414,506 A    12/1968  Campagne
5,108,932 A *   4/1992  Wolfbeis ............ G01N 21/6428
                                                          436/124
(Continued)

*Primary Examiner* — Renee Robinson
(74) *Attorney, Agent, or Firm* — Scott F. Yarnell

(57) ABSTRACT

Systems and methods are provided to allow for characterization of feeds, intermediate effluents, and/or products during lubricant base stock production. More generally, the systems and methods can allow for characterization of aromatics in various types of hydroprocessed intermediate effluents and/or products. In some aspects, the characterization can include measuring a fluorescence excitation-emission matrix spectrum for a sample, and then generating a representation of the spectrum by fitting the measured spectrum to a linear combination of spectra corresponding to compounds or compound classes. As the hydroprocessing process continues, additional measured spectra and comparing the fit quality of the representation to the subsequently measured spectra. When the fit quality falls below a threshold value, the loss in fit quality indicates a change in the number and/or distribution of aromatics in the sample. In other aspects, fluorescence excitation-emission spectroscopy can be used to characterize the amount of aromatics within a sample that correspond to one or more fluorescence compound classes. Based on this characterization, adjustments can be made to a process to reduce undesirable levels of aromatics, such as undesirable levels of polynuclear aromatics.

24 Claims, 17 Drawing Sheets

(51) Int. Cl.
*G01N 21/64* (2006.01)
*C10G 71/00* (2006.01)

(52) U.S. Cl.
CPC . *C10G 2300/202* (2013.01); *C10G 2300/301* (2013.01); *C10G 2300/302* (2013.01); *C10G 2400/10* (2013.01); *C10M 2203/003* (2013.01)

(56) References Cited

U.S. PATENT DOCUMENTS

| | | |
|---|---|---|
| 5,206,176 A * | 4/1993 | Beer ................. G01N 21/6402 110/185 |
| 7,704,930 B2 | 4/2010 | Deckman et al. |
| 7,776,206 B2 | 8/2010 | Miller et al. |
| 10,287,516 B2 | 5/2019 | Fruchey et al. |
| 2018/0187105 A1 | 7/2018 | Owens et al. |

\* cited by examiner

MONITORING OF HYDROPROCESSED FLUIDS BY OPTICAL SPECTROSCOPY

CROSS REFERENCE TO RELATED APPLICATIONS

This application claims priority to U.S. Provisional Application Ser. No. 62/923,806 FILED Oct. 21, 2019, which is herein incorporated by reference in its entirety.

FIELD OF THE INVENTION

Systems and methods are provided for characterization of products, intermediate effluents, and/or fractions thereof during hydroprocessing of feedstocks containing aromatic compounds.

BACKGROUND OF THE INVENTION

Lubricant base stocks are one of the higher value products that can be generated from a crude oil or crude oil fraction. The ability to generate lubricant base stocks of a desired quality is often constrained by the availability of a suitable feedstock. For example, most conventional processes for lubricant base stock production involve starting with a crude fraction that has not been previously processed under severe conditions, such as a virgin gas oil fraction from a crude with moderate to low levels of initial sulfur content.

More recently, methods have developed for forming lubricant base stocks from challenged fractions. One example of a lubricant production process that can result in production of heavy neutral base stocks and/or bright stocks with a high content of polynuclear aromatic compounds is production of base stocks from deasphalted oils. In particular, deasphalted oils formed using a solvent deasphalting process with a high yield of deasphalted oil (i.e., roughly 40 wt % or greater, or 50 wt % or greater), have an increased likelihood of containing high contents of aromatics, including polynuclear aromatics. The ability to form lubricant base stocks from a disadvantaged feed such as high lift deasphalted oil is potentially valuable, but it can be challenging using conventional processing methods to generate heavy neutral base stocks and/or bright stocks with desired levels of heavy polynuclear aromatics. U.S. Pat. No. 10,287,516 describes examples of block processing configurations that can be used for production of lubricant base stocks from such challenged feeds.

Some of the difficulties in producing lubricant base stocks, such as heavy neutral base stocks and/or bright stocks, can be related to the visual appearance of the base stock. Without being bound by any particular theory, it is believed that a variety of factors can result in coloration in a lubricant base stock, either during processing, immediately after processing, or subsequent to processing (such as after sitting for a period of time). One of the factors that can contribute to haze formation and/or less desirable base stock color is the presence of aromatics within a base stock. For example, if a heavy neutral base stock contains an excess of heavy aromatic compounds, the heavy aromatic compounds may not stay completely in solution after formation of the heavy neutral base stock, which could result in the base stock having a hazy appearance over time. Similarly, some heavy aromatic compounds can contribute to giving heavy neutral base stocks and/or bright stocks a darker and/or opaque appearance.

Heavy polynuclear aromatics correspond to aromatic compounds that include three or more aromatic rings, or four or more aromatic rings, or six or more aromatic rings. Traditionally, the feeds used for production of heavy neutral lubricant base stocks have corresponded to virgin and/or lightly processed vacuum gas oil boiling range feeds. Such traditional feeds typically have a lower content of polynuclear aromatics and therefore haze formation and/or the presence of color within the heavy neutral base stocks is of reduced concern.

What is needed are improved systems and methods for characterizing changes in the amount and/or type of aromatics, such as polynuclear aromatics, that are present in a potential lubricant base stock fraction.

U.S. Patent Application Publication 2018/0187105 describes solvent extraction methods for correction of color and aromatics distribution in heavy neutral basestocks. UV absorption is provided as an example of a method for characterizing the aromatics content in a potential basestock fraction before and/or after a solvent extraction process.

SUMMARY

In various aspects, methods are provided for making a hydroprocessed product, such as a lubricant boiling range hydroprocessed product. The methods can include hydroprocessing of a feedstock, followed by characterization or analysis of at least a portion of the hydroprocessed effluent by optical spectroscopy. Optionally, the at least a portion of the hydroprocessed effluent can further be exposed to an aromatic adsorbent prior to characterization or analysis. The optical spectroscopy can correspond to, for example, fluorescence excitation-emission matrix spectroscopy, in order to obtain a fluorescence excitation-emission matrix spectrum. A representation of the obtained fluorescence excitation-emission matrix spectrum based on a plurality of fluorescence reference spectra. The reference spectra can correspond to any convenient type of reference samples, such as spectra of individual aromatic core compound classes and/or spectra of previously characterized samples that include a plurality of aromatic core compound classes. A second hydroprocessed effluent can then be characterized using the optical spectroscopy to obtain a second fluorescence emission-excitation spectrum. This can correspond to a second hydroprocessed portion of the initial feedstock, or a portion of a different feedstock. A fit quality can then be determined for the representation of the first hydroprocessed feedstock portion relative to the second hydroprocessed feedstock portion. If the fit quality is below a threshold value, then a corrective action can be performed, such as modifying hydroprocessing and/or adsorption conditions.

DETAILED DESCRIPTION

Figure 1:
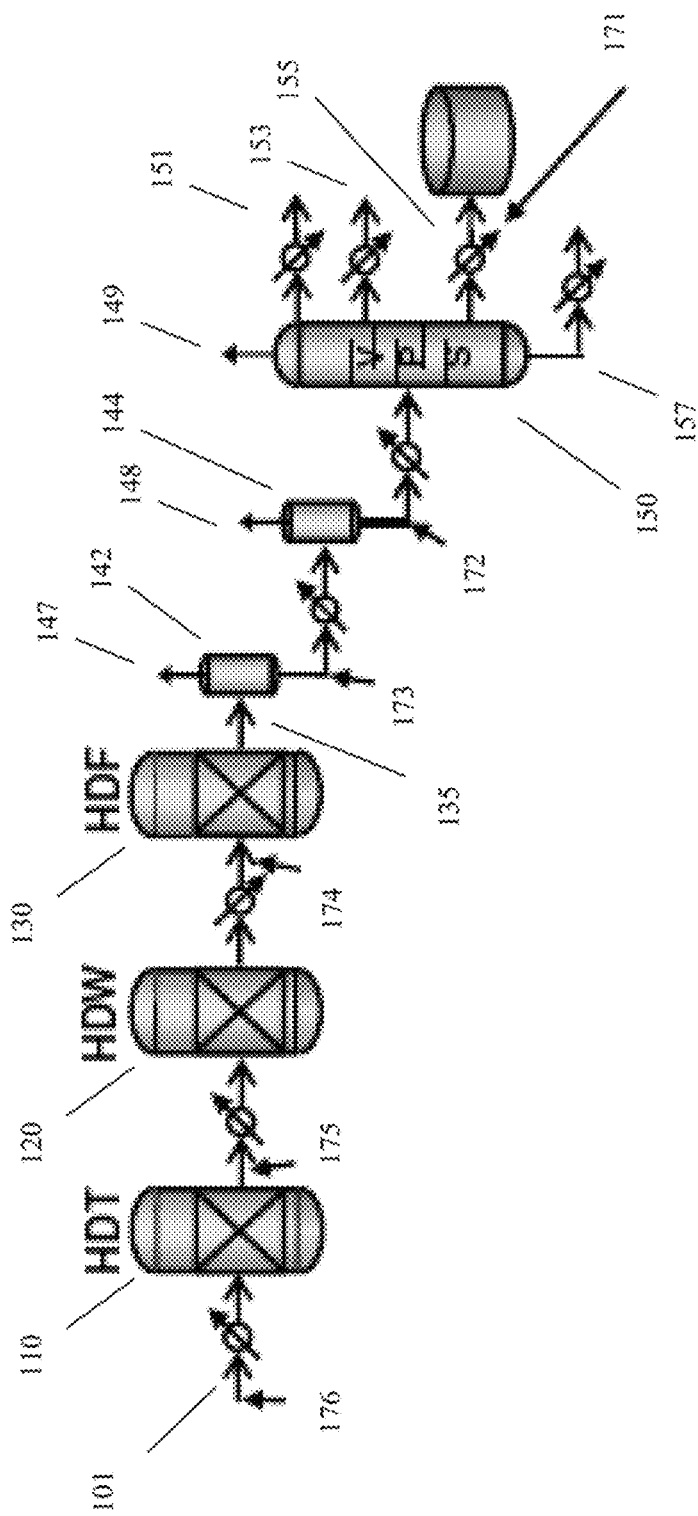
FIG. 1 shows examples of various sweet stage configurations for processing a deasphalted oil to form a lubricant base stock.

All numerical values within the detailed description and the claims herein are modified by "about" or "approximately" the indicated value, and take into account experimental error and variations that would be expected by a person having ordinary skill in the art.

Overview

In various aspects, systems and methods are provided to allow for characterization of feeds, intermediate effluents, and/or products during lubricant base stock production. More generally, the systems and methods can allow for characterization of aromatics in various types of hydroprocessed intermediate effluents and/or products. In some aspects, the characterization can include measuring a fluorescence excitation-emission matrix spectrum for a sample, and then generating a representation of the spectrum by fitting the measured spectrum to a linear combination of spectra corresponding to compounds or compound classes. As the hydroprocessing process continues, additional measured spectra and comparing the fit quality of the representation to the subsequently measured spectra. When the fit quality falls below a threshold value, the loss in fit quality indicates a change in the number and/or distribution of aromatics in the sample. This indicates that the hydroprocessing is no longer generating a substantially similar product, and therefore some type of corrective action can be beneficial to return the process to the original product output. In other aspects, fluorescence excitation-emission spectroscopy can be used to characterize the amount of aromatics within a sample that correspond to one or more fluorescence compound classes. Based on this characterization, adjustments can be made to a process to reduce undesirable levels of aromatics, such as undesirable levels of polynuclear aromatics. In still other aspects, fluorescence excitation-emission spectroscopy can be used to identify one or more characteristic excitation wavelengths and/or emission wavelengths for a sample. After identifying the excitation and/or emission wavelength(s), any convenient type of fluorescence spectroscopy can be used to monitor the intermediate effluent and/or product from a hydroprocessing process.

Fluorescence excitation-emission spectroscopy is an example of an optical method that can allow for detailed characterization of feeds, intermediate effluents, and/or products during lubricant base stock production. Fluorescence excitation-emission spectroscopy can provide a three-dimensional matrix of information, so that pairs of excitation wavelengths and emission wavelengths can be assigned individual intensity information.

It has been discovered that the three-dimensional characterization information generated by fluorescence excitation-emission spectroscopy can be effectively represented as a linear combination of model compound spectra. As a result, once a library of model compound spectra has been obtained, a representation corresponding to a model of composition can be developed for the aromatics contained within a sample. This representation corresponds to a fit of the model compound spectra to a measured spectrum. The suitability of the representation can be demonstrated using a typical measure of fit quality, such as a least squares characterization of fit quality.

Once a representation is fit to an initial measured spectrum for an intermediate effluent or product from a hydroprocessing process, a variety of options are available. In some aspects, the representation can be compared with subsequent spectra that are measured as the hydroprocessing process continues to operate to determine a "fit quality" for the representation relative to the subsequent spectra. As the process continues, catalyst aging can cause the activity of one or more hydroprocessing stages to be reduced, leading to changes in the amount and/or distribution of aromatics in the intermediate effluent or product. When the differences in aromatic content and/or distribution become large enough, the fit quality for the representation relative to a subsequent spectrum can fall below a threshold value. This indicates that the product being generated by the process is no longer substantially similar to the initial product. A corrective action can then be taken, such as increasing the severity of one or more of the hydroprocessing stages. In some aspects, this can restore the fit quality for subsequent spectra to the representation. Alternatively, a new representation can be generated after changing the hydroprocessing severity, thus establishing a new baseline for comparison.

In other aspects, generating a representation can allow for calculation of an amount of one or more compound classes that are present in a product or intermediate effluent. The calculated amount can be used directly to determine changes to the process conditions in order to achieve a target amount for the one or more compound classes. Alternatively, the calculated amount for the one or more compound classes in the product or intermediate effluent can be compared with an amount for the one or more compound classes in the feed and/or in an earlier intermediate effluent. The difference between the calculated amounts for the selected compound classes can be used to determine a modification of the processing conditions.

In still other aspects, generating a representation can allow for identification of one or more excitation wavelengths and/or emission wavelengths that are representative for a given feedstock. The one or more excitation wavelengths and/or emission wavelengths can then be monitored using any convenient fluorescence technique.

An example of a process that can benefit from monitoring of aromatics using fluorescence excitation-emission matrix spectroscopy is lubricant base stock production. Lubricant base stock production typically involves exposing a suitable feed to a series of catalysts under one or more types of hydroprocessing conditions. While the exact nature of the hydroprocessing steps can vary depending on the nature of the feed and the desired lubricant base stock products, the hydroprocessing can generally include hydrotreating, hydrocracking, catalytic dewaxing, and aromatic saturation. In some aspects, solvent dewaxing can also be performed. It is noted that in addition to hydroprocessing, production of lubricant base stocks can optionally further include exposing a feed or intermediate effluent to one or more aromatic adsorption processes.

Conventionally, characterization of aromatics in base stocks is based on single wavelength characterization methods, such as measuring UV-Visible adsorption at various wavelengths, or measuring fluorescence output based on a single excitation wavelength. Such methods can be beneficial for estimating total aromatics levels, but can be difficult to correlate with amounts of specific types of aromatics. For specific characterization of polynuclear aromatics in lubricant base stock products, such characterization is typically performed using techniques that are not fully suitable for integration with a refinery setting. For example, polynuclear aromatics can be characterized using chromatography methods, such as methods similar to those described in ASTM D5186 or ASTM D6591. While this can be effective, the delay between production of a base stock and the eventual characterization of aromatics can be substantial.

It has been discovered that using fluorescence excitation-emission matrix spectroscopy, along with improved analysis of the resulting data, can overcome one or more of the above deficiencies with conventional methods of characterizing polynuclear aromatics. In particular, fluorescence excitation-emission spectroscopy can assist with overcoming one of the major challenges when using hydroprocessing to form lubricant base stocks. During hydroprocessing, the activity of one or more catalysts within a hydroprocessing reaction system can be reduced over time. This can result in changes to the composition of the resulting products, including changes in the amounts of aromatics. By using fluorescence excitation-emission spectroscopy, a product and/or intermediate effluent can be monitored over time by comparing spectra with a representation generated from a prior spectrum. The spectra are compared with the representation by determining a fit quality of the representation to the spectra. When the fit quality becomes sufficiently low, this provides an indication that the process has changed, and that the process conditions should be changed.

One of the difficulties in performing lubricant base stock production is maintaining desirable color characteristics for the lubricant base stock product. Unfortunately, the color of lubricant base stocks can be impacted by relatively low levels of polynuclear aromatics. While polynuclear aromatics can be removed via hydroprocessing, operating the hydroprocessing at greater severity than needed for removal of the aromatics also tends to result in additional yield loss. Once a process severity has been identified that provides an acceptable product color while also achieving other target properties, maintaining the process severity can be desirable. Obtaining a model representation of a fluorescence excitation-emission spectrum at the desired process severity can provide a mechanism for determining when the product composition changes, either due to loss of catalyst activity, a change in the feedstock, or for any other convenient reason. Using the fit quality to determine when a sufficient product quality change has occurred can allow the change in product quality to be detected without having to specify in advance a particular spectral feature. For example, a particular polynuclear aromatic that causes color formation does not need to be characterized. Additionally, using the fit quality can allow a change in product quality to be detected automatically, without requiring separate data analysis by an operator.

It is noted that modifying the severity of a processing system can be accomplished in a variety of manners. In some aspects, the reaction conditions for one or more processing stages can be modified. In other aspects where at least one aromatics adsorption stage is included in the hydroprocessing system, the severity of the aromatics adsorption process can be modified.

Analysis of Fluorescence Excitation-Emission Matrix Spectra—Compound Class Analysis In various aspects, fluorescence excitation-emission matrix spectroscopy can be used to determine spectra for a plurality of representative compound classes. The spectra for the compound classes can then be used as a basis set for analysis of spectra obtained for lubricant base stock samples. By using an appropriate technique, such as performing a least squares fit, a representation can be generated for a lubricant base stock spectrum as a linear combination of the compound classes. It has been discovered that a representation of a spectrum constructed based on a linear combination of compound classes provide a high quality fit for a measured spectrum.

In order to construct a representation of a spectrum, a library of model compounds is needed. To build a library of model compounds, spectra can be obtained for various compounds. The library of model compounds can include various types of aromatic ring structures, including polynuclear aromatic ring structures, that might be expected to occur within a hydrocarbon feed. The nature of the library could vary depending on the nature of the feed, product, and/or intermediate effluents that are intended for analysis. For example, if the analysis will be performed on fractions that only include lubricant boiling range compounds as part of an effort to avoid production of base stocks with unsuitable color, then the library of model compounds could focus on polynuclear aromatics, as polynuclear aromatic cores are the most likely structures to cause color. As another example, if the analysis will be performed on fractions containing only naphtha and distillate compounds, the model compounds can focus on ring structures that can realistically be present in compounds with a boiling point of less than 400° C., or less than 375° C., or less than 350° C. In the more general case, model compounds can be included for any type of ring structure that could be present in a meaningful amount based on the boiling range of the feeds/products/intermediate effluents that are going to be characterized.

It is noted that not every polynuclear aromatic compound (or more generally, not every aromatic core/aromatic ring structure) needs to be included in the library. Instead, the model compounds can be selected to have representative core ring structures. Without being bound by any particular theory, it is believed that alkane side chains can have a low impact on the fluorescence behavior of a core ring structure. Therefore, the model compounds in the library can correspond to compound classes, representing any compound in a sample that has a similar core ring structure, regardless of additional non-ring hydrocarbon substituents.

In some aspects, the core structures in the model compound library can focus on hydrocarbon cores, so that only carbon and hydrogen are present in the core ring structures. If it is desired to construct representations of samples including substantial amounts of heteroatoms such as sulfur, nitrogen, and/or oxygen, then aromatic cores including such heteroatoms could also be represented in the model compound library. However, because the products and intermediate effluents can typically correspond to hydroprocessed fractions, in many aspects the number of aromatic cores including heteroatoms will often be minimized.

As an example, one potential application for fluorescence excitation-emission matrix analysis is characterization of products and/or intermediate effluents during lubricant base stock production. Due to the nature of the hydroprocessing in lubricant base stock production, the content of heteroatoms can be relatively low in the product base stock(s), intermediate effluent(s) exiting from sweet hydroprocessing stages, or intermediate effluents exiting from the final sour hydroprocessing stage. Therefore, changes in fluorescence behavior of aromatic cores due to the presence of electrophilic heteroatoms in side chains should be minimal. As a result, by selecting appropriate core ring structures as model compounds, a suitable basis set of model compounds (representing compound classes) can be developed for modeling the fluorescence behavior of a base stock product and/or intermediate effluent.

In aspects related to characterization of lubricant base stock production, one option for building a model compound library can be to include a model core structure for some or all known aromatic hydrocarbon cores that include three or more rings, such as aromatic cores containing between three rings and seven rings, or between three rings and six rings. It is noted that the aromatic hydrocarbon core may include non-aromatic rings, so an aromatic core containing six rings may only include 4 aromatic rings. In other aspects, the basis set can include aromatic cores that are believed to be most likely to occur and/or most likely to have the highest concentration in a lubricant base stock sample. In yet other aspects, any convenient method can be used to select the aromatic cores that serve as model compounds. More generally, the model compound library for representing a sample of interest can be formed in any convenient manner. The model compound library can comprehensively include any possible ring structures that can exist within a defined boiling range; or the model compound library can include the most likely ring structures (based on general concentrations or based on specific knowledge of the likely ring structures in a given sample); or the model compound library can be constructed based on another set of considerations.

An example of another set of considerations for selecting compounds for a model compound library can be to select model compounds based on hydrogen deficiency and/or Z-class. The "hydrogen deficiency" of a compound is a comparison of the number of hydrogen atoms in a compound relative to the expected number of hydrogen atoms if only "CH$_2$" units were present in a compound. Thus, the hydrogen deficiency for a straight chain alkane is +2, the hydrogen deficiency for a cyclic alkane or an alkene with a single double bond is 0, and the hydrogen deficiency for a cyclic alkene with a single double bond, a straight chain alkene with two double bonds, or a straight chain alkyne with one triple bond is −2. The hydrogen deficiency for benzene is −6. As additional functional groups are included within a hydrocarbon, lower hydrogen deficiencies can occur. Z-class is related to hydrogen deficiency, but Z-class also reflects hydrogens that are missing due to the presence of atoms other than hydrogen and carbon within a hydrocarbon-like compound.

Once a representation is constructed for a first measured spectrum based on model compound spectra, the representation can be used to determine a fit quality (such as a least squares fit quality) relative to subsequently obtained spectra. One option can be to determine a fit quality relative to the entire spectrum. Additionally or alternately, a fit quality can be obtained for defined portions of a spectrum. For example, based on the nature of the aromatic core structures, the most likely boiling range for compounds corresponding to each aromatic core can be determined. This can allow a representation to be divided into boiling range portions, such as dividing a representation into naphtha, distillate, lubricant (vacuum gas oil), and resid portions. In such aspects, a separate fit quality can be determined, for example, for just the naphtha or just the distillate boiling range portion of the representation versus the naphtha boiling range portion of a measured spectrum. Determining a fit quality for portions of the representation relative to a measured spectrum can be beneficial in various ways. In some aspects, if the overall fit quality drops below a threshold value, but nearly all of the error in the fit quality is due to poor fit quality for the naphtha boiling range portion, it may be desirable to continue processing at the current hydroprocessing conditions until the fit quality for another portion of representation falls below a threshold value. Conversely, if the fit quality for the overall representation is good, but a portion of the representation has a poor fit quality, it may be desirable to modify the hydroprocessing conditions even though the overall fit quality is still greater than a target threshold value.

In this discussion, fit quality for a representation to a measured spectrum was defined as the residual from a least squares fit. Least squares was used to fit the library to the measured data using the form: $\min_x \|C \cdot x - d\|^2_2$, where $x \geq 0$, C=library and d=measured spectrum. The output also returns the normalized residual (squared 2-norm=norm $(C^*x-d)^2$) and the residual ($r = d - C^*x$) which can be used for a fit value. In other aspects, a modified residual can be used in the spectral regions that are well represented in the library spectra. In still other aspects, other statistical fit qualities like $R^2$ can be used.

In various aspects, the threshold value for the fit quality for a representation relative to a measured spectrum can be 0.95 or more, or 0.97 or more, such as up to 0.995 or possibly still higher. In such aspects, a fit quality greater than the threshold value indicates that the product generated by the hydroprocessing (and/or aromatic adsorption) at the current time is sufficiently similar to the product corresponding to the representation that the current processing conditions can be maintained. A fit quality value below the threshold value indicates that a corrective action may be needed, such as an increase in hydroprocessing severity, an adjustment of process conditions to accommodate a new feedstock, or another type of modification. In aspects where fit quality is assessed for a portion of a representation relative to a portion of a spectrum, the threshold value for the fit quality for the portion of the representation can be 0.95 or more, or 0.97 or more, such as up to 0.995 or possibly still higher.

Figure 3:
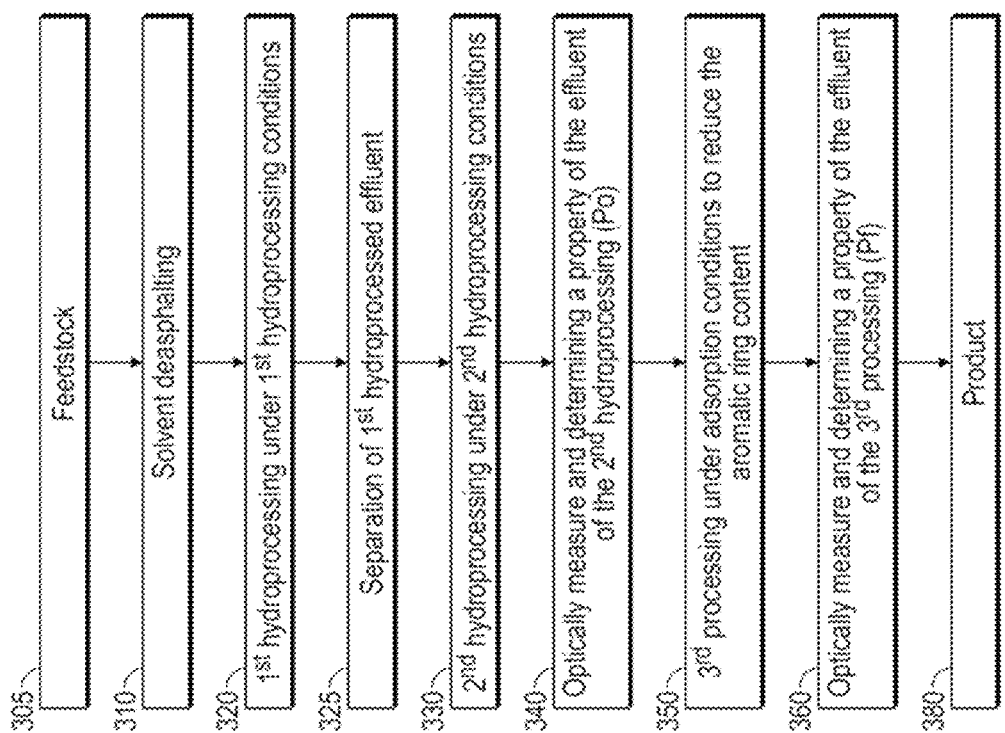
FIG. 3 shows an example of a method for integrating optical spectroscopy with a lubricant production process.

Example of Process Flow for Integrating Spectroscopy with Lubricant Base Stock Production FIG. 3 shows an example of a process flow for producing lubricant base stocks with integrated characterization of aromatics, including polynuclear aromatics. In the example shown in FIG. 3, lubricant base stocks are produced from a challenged feed in the form of a deasphalted oil. More generally, characterization of polynuclear aromatics can be incorporated into any convenient type of process flow for lubricant base stock production.

In the example shown in FIG. 3, an initial feedstock 305 is passed into a deasphalting stage 310. Deasphalting stage 310 can optionally be a high lift deasphalting stage, to produce a deasphalted oil yield of 40 wt % or more, or 50 wt % or more, relative to the vacuum resid portion of the feedstock 305.

The deasphalted oil from deasphalting stage 310 can then be passed into one or more hydroprocessing stages, such as a plurality of hydroprocessing stages that further include one or more intermediate separation stages. In the example shown in FIG. 3, the deasphalted oil can initially be passed into a first hydroprocessing stage 320, such as a sour hydroprocessing stage. The first hydroprocessing stage 320 can include at least one set of first hydroprocessing conditions. The at least one set of first hydroprocessing conditions can include one or more of a) hydrotreating conditions to reduce the content of sulfur, nitrogen, and/or other heteroatoms different from carbon and hydrogen that are present in the feed, and b)hydrocracking conditions for viscosity index uplift and/or additional heteroatom removal by conversion of portions of the feedstock to lower boiling compounds. During and/or after first (sour) hydroprocessing stage 320, one or more separations 325 can be performed to allow for removal of contaminant gases (e.g., $H_2S$, $NH_3$) generated in first hydroprocessing stage 320 from the first hydroprocessed effluent. Portions of the first hydroprocessed effluent boiling below the lubricant boiling range can also optionally be removed in separation stage 325.

The lubricant boiling range feed from separation stage 325 can then be passed into a second hydroprocessing stage 330. The second hydroprocessing stage 330 can correspond to a sweet hydroprocessing stage, where the sulfur content and nitrogen content of the input flow are below desired threshold values. The second hydroprocessing stage 330 can be operated under at least one set of second hydroprocessing conditions. The at least one set of second hydroprocessing conditions can include one or more of i) hydrocracking conditions to provide additional viscosity index uplift by feed conversion; ii) catalytic dewaxing conditions to improve cold flow properties, such as pour point and/or cloud point; and iii) aromatic saturation conditions for reduction of aromatics.

At this point, the effluent from second hydroprocessing stage 330 can be analyzed 340. In some aspects, the analysis can include determining the content of polynuclear aromatics in the effluent, such as by performing fluorescence excitation-emission matrix spectroscopy to collect an optical spectrum. Additionally or alternately, the collected optical spectrum can be used to determine one or more other properties. For example, the collected optical spectrum can be used to determine a viscosity (such as kinematic viscosity), a density (such as API gravity), compositional features (such as prediction of the amount of polynuclear aromatics based on optical spectroscopy), or another convenient type of analysis. The effluent from the second hydroprocessing stage 330 can then be passed into an aromatics adsorption stage 350, such as an adsorption stage where the second hydroprocessed effluent is exposed to an activated carbon adsorbent under adsorption conditions. The effluent from adsorption stage 350 can then be analyzed again in a second analysis stage 360. The analysis in the second analysis stage 360 can include determination of at least one property that was determined in first analysis stage 340. In some aspects, the at least one property can correspond to a predicted content of polynuclear aromatics. It is noted that the location of the first analysis 340 and the second analysis 360 in the process sequence can be varied. For example, the first analysis and second analysis could be performed before and after a hydroprocessing step. As another option a hydroprocessing step and an adsorption step could be included between the first analysis and the second analysis. As still another option, any convenient step or combination of steps could be performed between the first analysis and the second analysis.

A variety of options are available based on the analysis of the effluent from adsorption stage 350 (or more generally the analysis of an effluent from a convenient processing stage). If the level of polynuclear aromatics is sufficiently low (and/or another property is within a desired range), the effluent from adsorption stage 350 can be used as a base stock product 380, optionally after any other additional treatment, blending, and/or other processing that might be desired. Alternatively, if the level of polynuclear aromatics is higher than a desired level (and/or another property is outside of a desired range), the results from first analysis stage 340 and second analysis stage 360 can be examined. For example, if the amount of one or more compound classes of aromatics is too high in first analysis stage 340, the hydroprocessing conditions in the first hydroprocessing stage 320 and/or second hydroprocessing stage 330 can be adjusted. This could include, but is not limited to, reducing a space velocity in the first hydroprocessing stage 320 so that a first set of hydroprocessing conditions can be modified to have a reduced severity; reducing a severity of hydrocracking in the second set of hydroprocessing conditions; modifying a temperature of catalytic dewaxing and/or aromatic saturation in the second hydroprocessing stage; and replacing one or more catalysts in the first hydroprocessing stage or second hydroprocessing stage, so that the severity of processing conditions can be reduced. Alternatively, if the amount of one or more compound classes of aromatics is acceptable in first analysis stage 340, but is not sufficiently reduced during adsorption stage 350, the conditions in adsorption stage 350 can be modified.

In some alternative aspects, the order of the steps shown in FIG. 3 can be modified. For example, the adsorption stage 350 can be located upstream from second hydroprocessing stage 330. In such an aspect, the "second" analysis stage 360 can be located after adsorption stage 350 and prior to second hydroprocessing stage 330.

In still other aspects, modifications to the hydroprocessing conditions and/or the aromatic adsorption conditions can be made based on obtaining only one fluroscence spectrum, such as a spectrum obtained by the second analysis stage 360. In such aspects, first analysis stage 340 can be optional. More generally, modifications to the hydroprocessing conditions and/or the aromatic adsorption conditions can be made based on performing one analysis step or one set of analysis steps.

Example of Spectrometer Configuration

Figure 4:
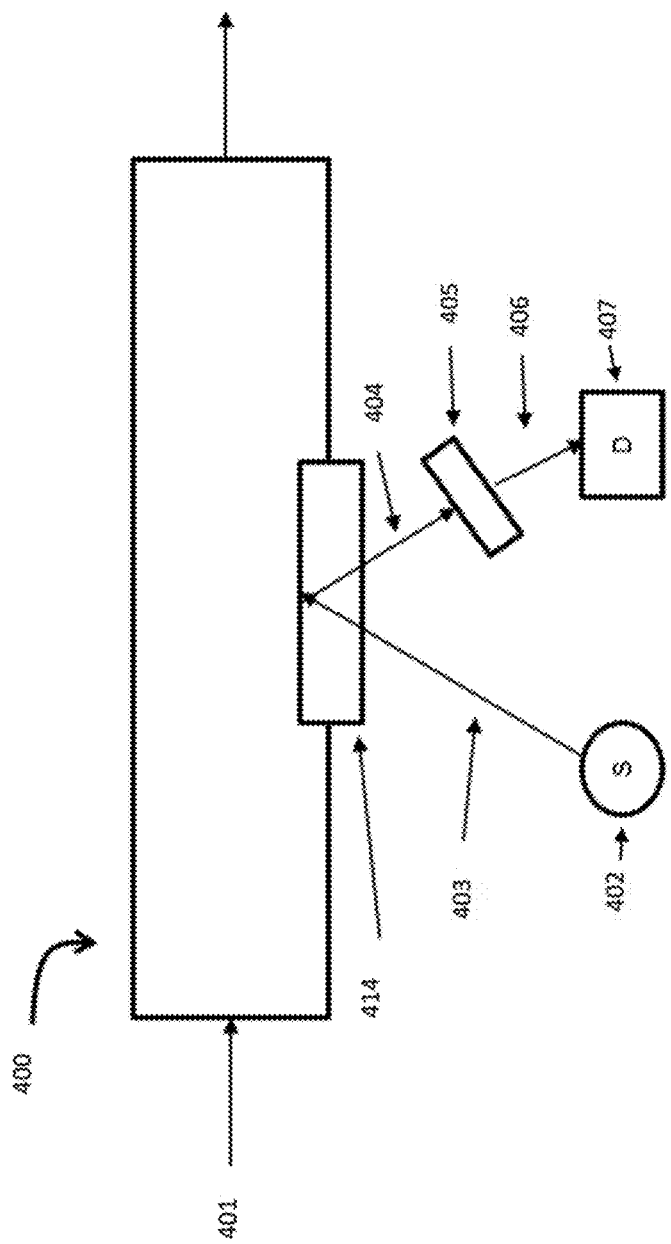
FIG. 4 shows an example of a system for integrating optical spectroscopy with a lubricant production process.

FIG. 4 shows an example of a spectrometer configuration for in-line characterization of polynuclear aromatics. FIG. 4 shows a flow path 400 for a lubricant base stock production process. In the example shown in FIG. 4, effluent 401 represents a feed/intermediate effluent/product at a location within the process train for producing a lubricant base stock. Effluent 401 is contained in a pipe that includes an optically transparent window 414. The optically transparent window 414 allows the effluent 401 to be interrogated by light to perform spectroscopy. It is noted that the flow path 400 shown in FIG. 4 can correspond to a side stream flow path, so that the characterization is performed in a conduit containing a subset of the total effluent flow in the reaction system. It is also noted that the flow path 400 could allow for the effluent 401 to be blocked in for a time to allow for longer measurements.

In FIG. 4, incident light 403 from a light source 402 interrogates effluent 401 through window 414. Incident light 403 is electromagnetic radiation of at least one wavelength. Incident light 403 can be a wavelength that excites polynuclear aromatic species contained in the effluent 401 resulting in emitted light 404 due to fluorescence. Emitted light 404 can be composed of light having at least one wavelength. The emitted light 404 exits optically transparent window 414. In some aspects, transparent window 414 can correspond to a single window, or a plurality of windows can be used, such as a first window for transmission of incident light 403 and a second window for transmission of emitted light 404. As still another option, an optical fiber can be used to couple the light source 402 to transparent window 414, thus allowing incident light 403 to interact with the effluent 401.

The emitted light 404 can then be analyzed. In the configuration shown in FIG. 4, a wavelength selection device 405 can be used to isolate analytical light 406 from the emitted light 404. Analytical light 406 can correspond to at least one wavelength from the emitted light 404. Analytical light can correspond to light that has been conditioned to remove unwanted light, such as incident light 403. Analytical light 406 is directed to an optical transducer 407 which measures the intensity of analytical light 406 and outputs a signal (voltage or current) proportional to the amount of heavy polynuclear aromatic species. The signal is used to measure the effectiveness of the removal of heavy polynuclear aromatic species in the lubricant base stock production process. As yet another option, an optical fiber can be used to couple emitted light 404 to the wavelength selective device 405.

A spectrometer as shown in FIG. 4 can be included at any convenient location within a reaction system. For example, in a reaction system such as the reaction system shown in FIG. 2, a spectrometer as shown in FIG. 4 could be included within sour processing stage 620; after sour processing stage 620 but prior to sweet processing stage 650; within sweet processing stage 650; or after sweet processing stage 650. As another example, in the reaction system shown in FIG. 1, a spectrometer as shown in FIG. 4 could be used to analyze a sample from input flow 176; a sample from intermediate effluents 175 or 174; a sample from products 135, 173, or 172; or a sample from product fractions 151, 153, 155, or 157.

Analysis of Fluorescence Excitation-Emission Matrix Spectra—Wavelength Analysis

In some aspects, the fluorescence spectrum can be analyzed based on analysis of a limited portion of the available matrix spectrum. This can correspond to analysis of a plurality of emission wavelengths generated based on at least one excitation wavelength and/or analysis of at least one emission wavelength generated based on a plurality of excitation wavelengths.

When performing spectrum analysis based on a limited number of wavelengths, the at least one emission wavelength and/or at least one excitation wavelength can be selected in any convenient manner. In some aspects, the at least one emission wavelength and/or at least one excitation wavelength can be selected based on a wavelength that corresponds to an excitation/emission wavelength for a compound class; based on a wavelength that corresponds to a high intensity value in the initial feed and/or in the hydroprocessed effluent from the first stage; based on a wavelength that is believed to be representative of the amount of polynuclear aromatics; or a wavelength selected in another convenient manner.

In some optional aspects, fluorescence excitation-emission matrix spectroscopy can be used to determine a suitable excitation and/or emission wavelength. After determining a suitable wavelength (or wavelengths), in-situ monitoring of a lubricant base stock sample can be performed using a simpler fluorescence spectrometer that is designed for excitation at a single wavelength or small plurality of excitation wavelengths and/or designed for monitoring of a single emission wavelength or a small plurality of emission wavelengths.

Overview of Lubricant Base Stock Production from Deasphalted Oil

As an example of a process for production of lubricant base stocks, a deasphalted oil can be hydroprocessed (hydrotreated and/or hydrocracked) in a sour stage at sufficient severity so that ~700° F.+(370° C.+) conversion is 10 wt % to 40 wt %. The hydroprocessed effluent can be fractionated to separate lower boiling portions from a lubricant base stock boiling range portion. The lubricant boiling range portion can then be further hydroprocessed (hydrotreated, hydrocracked, dewaxed, and/or hydrofinished) in a sweet processing stage to produce a catalytically dewaxed effluent. At one or more locations during and/or after the sweet hydroprocessing, at least a portion of the hydroprocessing effluent can be exposed to an adsorbent for removal of heavy polynuclear aromatics.

In various aspects, a variety of combinations of catalytic and/or solvent processing can be used to form lubricant base stocks from deasphalted oils. These combinations include, but are not limited to:

a) Hydroprocessing of a deasphalted oil under sour conditions (i.e., sulfur content of at least 500 wppm); separation of the hydroprocessed effluent to form at least a lubricant boiling range fraction; and catalytic dewaxing of the lubricant boiling range fraction under sweet conditions (i.e., 500 wppm or less sulfur). The catalytic dewaxing can optionally correspond to catalytic dewaxing using a dewaxing catalyst with a pore size greater than 8.4 Angstroms. Optionally, the sweet processing conditions can further include hydrocracking, noble metal hydrotreatment, and/or hydrofinishing. The optional hydrocracking, noble metal hydrotreatment, and/or hydrofinishing can occur prior to and/or after catalytic dewaxing. For example, the order of catalytic processing under sweet processing conditions can be noble metal hydrotreating followed by hydrocracking followed by catalytic dewaxing.

b) The process of a) above, followed by performing an additional separation on at least a portion of the catalytically dewaxed effluent. The additional separation can correspond to solvent dewaxing, solvent extraction (such as solvent extraction with furfural or n-methylpyrollidone), a physical separation such as ultracentrifugation, exposure to an adsorbent for removal of aromatics (such as heavy polynuclear aromatics) or a combination thereof.

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In this discussion, conditions may be provided for various types of hydroprocessing of feeds or effluents. Examples of hydroprocessing can include, but are not limited to, one or more of hydrotreating, hydrocracking, catalytic dewaxing, and hydrofinishing/aromatic saturation. Such hydroprocessing conditions can be controlled to have desired values for the conditions (e.g., temperature, pressure, LHSV, treat gas rate) by using at least one controller, such as a plurality of controllers, to control one or more of the hydroprocessing conditions. In some aspects, for a given type of hydroprocessing, at least one controller can be associated with each type of hydroprocessing condition. In some aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature; and one or more flow meters and one or more associated valves that control relative flow rates of at least two flows. Such controllers can optionally include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). Optionally, at least one hydroprocessing condition for a given type of hydroprocessing may not have an associated controller.

In this discussion, unless otherwise specified a lubricant boiling range fraction corresponds to a fraction having an initial boiling point or alternatively a T5 boiling point of at least 370° C. (~700° F.) and a final boiling point or T95 boiling point of 566° C. or less (~1050° F.). A distillate fuel boiling range fraction, such as a diesel product fraction, corresponds to a fraction having a boiling range from 193° C. (375° F.) to 370° C. (~700° F.). Thus, distillate fuel boiling range fractions (such as distillate fuel product fractions) can have initial boiling points (or alternatively T5 boiling points) of at least 193° C. and final boiling points (or alternatively T95 boiling points) of 370° C. or less. A naphtha boiling range fraction corresponds to a fraction having a boiling range from 36° C. (122° F.) to 193° C. (375° F.). Thus, naphtha fuel product fractions can have initial boiling points (or alternatively T5 boiling points) of at least 36° C. and final boiling points (or alternatively T95 boiling points) of 193° C. or less. It is noted that 36° C. roughly corresponds to a boiling point for the various isomers of a C5 alkane. A fuels boiling range fraction can correspond to a distillate fuel boiling range fraction, a naphtha boiling range fraction, or a fraction that includes both distillate fuel boiling range and naphtha boiling range components. Light ends are defined as products with boiling points below 36° C., which include various C1-C4 compounds. When determining a boiling point or a boiling range for a feed or product fraction, an appropriate ASTM test method can be used, such as the procedures described in ASTM D2887, D2892, and/or D86. Preferably, ASTM D2887 should be used unless a sample is not appropriate for characterization based on ASTM D2887. For example, for samples that will not completely elute from a chromatographic column, ASTM D7169 can be used. A "Tx" boiling point refers to a fractional weight boiling point corresponding to the temperature where "x" wt % of a fraction will boil.

In this discussion, heavy polynuclear aromatics generally refer to aromatic compounds having three or more rings in the aromatic core of the compound, but if specified this definition can be limited to four or more rings, or six or more rings. For products that involve formation of at least one distillation intermediate, so that the resulting product is not formed only by processing the bottoms products from each distillation in the process, the heavy polynuclear aromatics can typically correspond to aromatic compounds having up to nine rings in the aromatic core. For example, in a process flow where both a heavy neutral base stock and a bright stock are produced, production of the heavy neutral base stock can include formation of at least one distillation intermediate while the bright stock may correspond to a product formed only from bottoms fractions during each distillation process. It is noted that aromatic compounds with ten or more rings in the aromatic core typically have high boiling points, and are not present in distillate fractions.

Adsorbents for Aromatic Compounds

In various aspects, an adsorbent suitable for selective adsorption of heavy polynuclear aromatics is used to remove heavy polynuclear aromatics from a base stock fraction, either during or after hydroprocessing to form the base stock fraction. Due to the nature of the hydroprocessing that is typically used for formation of a lubricant base stock, the aromatic content of a base stock fraction can be relatively low. This can make adsorption of heavy polynuclear aromatics feasible in a commercial scale process.

Adsorption of heavy polynuclear aromatics can be accomplished by exposing an input stream containing the heavy polynuclear aromatics to the adsorbent under effective adsorption conditions. The effective conditions can include an exposure temperature, an exposure residence time, the viscosity of the input stream, and the amount of adsorbent relative to the amount of the input stream. For example, the viscosity of the input stream to the adsorbent can be 15 cP or less at 150° C., or 13 cP or less, or 10 cP or less, such as down to 4 cP or possibly still lower. The exposure temperature can be 80° C. to 300° C., or 100° C. to 250° C., or 100° C. to 200° C., or 100° C. to 150° C. In aspects where activated carbon is used as the adsorbent, lower temperatures may be preferable, such as temperatures of 80° C. to 200° C., or 100° C. to 200° C., or 150° C. to 200° C., or 100° C. to 150° C. In aspects where the adsorbent corresponds to a zeolite (i.e., a material with a zeolitic framework structure), higher temperatures can be used but with a possible corresponding decrease in adsorbent capacity. The residence time can be 1 minute to 800 minutes, or 5 minutes to 120 minutes, or 10 minutes to 30 minutes. The ratio of the weight of the input stream relative to the weight of the adsorbent during the residence time can be from 2 to 10. It is noted that that the exposure conditions can be interdependent. For example, a higher viscosity input stream can tend to require a higher exposure temperature and/or a longer residence time in order to achieve a desired level of heavy polynuclear aromatics removal.

In some aspects, the viscosity of the input stream to the adsorbent can be 13 cP to 15 cP at 150° C. while the exposure temperature can be 160° C. to 250° C., or 160° C. to 200° C. In some aspects, the viscosity of the input stream to the adsorbent can be 10 cP to 13 cP at 150° C. while the exposure temperature can be 120° C. to 160° C. In some aspects, the viscosity of the input stream to the adsorbent can be 8 cP to 10 cP at 150° C. while the exposure temperature can be 80° C. to 120° C.

In some aspects, it can be desirable to modify the viscosity of the input stream to the adsorbent in order to facilitate adsorption of aromatics. A variety of hydrocarbon streams are potentially suitable as a solvent or diluent for addition to the input stream to an adsorbent. Desirable properties for the diluent can include, but are not limited to, a dynamic viscosity and/or kinematic viscosity that is lower than the input stream viscosity; an ability to separate the diluent from the base stock product after adsorption; and a low content of compounds that may be considered as less desirable in a lubricant base stock, such as aromatics, sulfur-containing compounds, or nitrogen-containing compounds. An example of a suitable diluent can be a distillate fuel boiling range portion of the fuels fraction generated by first (sour) hydroprocessing stage, the second (sweet) hydroprocessing stage, or a combination thereof. After performing sufficient hydroprocessing to make a low sulfur-content lubricant boiling range fraction, the amount of aromatics, sulfur, and/or nitrogen in a fuels fraction can be still lower than the corresponding amounts in the lubricant boiling range fraction. A distillate fuel boiling range portion of the fuels fraction can also be readily separated from a base stock fraction by distillation.

Activated carbon is an example of a suitable adsorbent for removal of heavy polynuclear aromatics. It is noted that activated carbon can also potentially adsorb other compounds that may be present in a hydroprocessed effluent that contains a base stock fraction. For example, activated carbon can potentially adsorb naphthenic compounds, partially unsaturated naphthenic compounds, and paraffinic compounds. In some aspects, the selectivity of activated carbon for adsorption of heavy polynuclear aromatics relative to naphthenic and/or paraffinic compounds can be enhanced by use of an activated carbon having an increased percentage of slit-like pores, as opposed to an activated carbon with an increased percentage of large pores and/or round pores. Additionally or alternately, adsorption of heavy polynuclear aromatics can potentially be increased by modifying the surface of the activated carbon to have an increased percentage of surface hydroxyl groups. This can increase the polarizability of the surface, which can assist with increasing the selectivity of compounds that can be partially polarized (such as aromatic ring structures) relative to compounds with low polarizability (hydrocarbons with little or no unsaturation). In some aspects, other adsorbents that can be used in place of or in addition to activated carbon for selective removal of heavy polynuclear aromatics can include, but are not limited to, attapulgus clay and/or other adsorbent clays, silica or alumina with greater than 10 $m^2/g$ BET surface area, porous polymer or resin, diatomaceous earth, or zeolite.

Exposure of an intermediate effluent or final effluent from base stock production to an adsorbent can be performed in any convenient manner. Typical configurations for an adsorbent correspond to standard packed beds, lead/lag configurations, parallel configurations, and any other configuration that allows for a sufficient residence time for contact of the intermediate effluent or final effluent with the adsorbent.

As an example, in some configurations, an adsorbent is provided in a plurality of vessels, such as two to twenty vessels. In such an example, during operation roughly half of the vessels can serve as an adsorbent vessel at any given time, while the other half of the vessels are undergoing regeneration and/or replacement of the adsorbent. Other options for staggering the usage of a plurality of vessels can also be used, such as having a first set of vessels operating as adsorbents, a second set of vessels being regenerated, and a third set of vessels that are waiting to be used as the adsorbent vessels. Within a vessel containing an adsorbent bed, the inner diameter of the bed can be from 1.0 m to 8.0 m, while the bed height can be from 5.0 m to 12.0 m. An intermediate or final effluent from base stock production can be exposed to the adsorbent for any convenient amount of contact time, such as a contact time of 10 minutes to 1000 minutes or possibly more.

Integration of Adsorbents for Aromatic Compounds with Lubricant Base Stock Production FIG. 1 schematically shows an example of the sweet stage portion of a process configuration for production of base stocks from a deasphalted oil. FIG. 1 shows various locations where the (partially) hydroprocessed effluent from the sweet stage can potentially be exposed to an adsorbent for removal of heavy polynuclear aromatic compounds.

In the exemplary sweet stage configuration shown in FIG. 1, reactors for hydrotreatment, catalytic dewaxing, and hydrofinishing are represented. It is understood that actual systems can include more than one type of catalyst in a reactor. As a few examples, hydrocracking catalyst can be included prior to and/or after hydrotreatment catalyst, dewaxing catalyst, or aromatic saturation catalyst in a reactor; dewaxing catalyst can be included prior to and/or after hydrotreatment catalyst, hydrocracking catalyst, aromatic saturation catalyst, hydrofinishing catalyst, or any other type of catalyst in a reactor; and hydrofinishing catalyst or aromatic saturation catalyst can appear at a variety of locations throughout hydroprocessing reactors. It is further noted that any convenient number of reactors can potentially be used. The choice of showing three reactors in FIG. 1 is for convenience in explaining the nature of the process.

The configuration shown in FIG. 1 also shows gas liquid type separators and a vacuum pipestill or other type of fractionation tower. More generally, any convenient types and combinations of separators or fractionators can be used to generate desired lubricant base stock product fractions.

In FIG. 1, the input feed 101 corresponds to a lubricant boiling range portion of the effluent from a prior sour processing stage. The input feed 101 is passed through various hydroprocessing stages, such as the hydrotreating/hydrocracking stage 110, catalytic dewaxing stage 120, and hydrofinishing stage 130 shown in FIG. 1. The resulting catalytically dewaxed 135 effluent (or hydroprocessed effluent) is then separated, such as using a high pressure, high temperature gas-liquid separator 142, a low pressure, high temperature gas-liquid separator 144, and a fractionation tower 150, to form various product fractions. The various product fractions include light ends fractions 147, 148, and 149, a fuels fraction 151, and various lubricant base stock fractions, such as a light neutral base stock fraction 153, a heavy neutral base stock fraction 155, and a bright stock fraction 157.

FIG. 1 further shows various locations where the hydroprocessed effluent (possibly at an intermediate stage of hydroprocessing) can be exposed to an adsorbent for removal of polynuclear aromatics. FIG. 1 shows six possible locations. In some aspects, an adsorbent is used in one of the locations represented in FIG. 1. In some aspects, an adsorbent is used at multiple locations within the sweet processing stage, such as two or more locations, or three or more locations. The first location for an adsorbent corresponds to exposing a base stock fraction to the adsorbent after fractionation, such as exposing heavy neutral base stock fraction 155 to adsorbent 171. The second location and third location correspond to locations for exposing the liquid portion of the hydroprocessed effluent 135 to an adsorbent 172 and/or 173 prior to entering fractionation tower 150. The fourth location corresponds to exposing the partially hydroprocessed effluent 125 from catalytic dewaxing stage 120 to an adsorbent 174 prior to entering hydrofinishing stage 130. The fifth location corresponds to exposing hydrotreated effluent 115 to adsorbent 175 prior to entering catalytic dewaxing stage 120. The sixth location corresponds to exposing the input feed 101 to an adsorbent 176 prior to entering hydrotreatment stage 110. It is noted that heaters, heat exchangers, valves, and other typical components of a reaction system may also be present in the configuration, such as the heat exchangers for heating and cooling of the input feed and the various intermediate streams as shown in FIG. 1.

A configuration that includes adsorbent bed 171 corresponds to a configuration where the heavy polynuclear aromatics are removed after separation of desired lubricant base stock cuts from the hydroprocessed effluent. Even for a reaction system operated in block mode, the hydroprocessing will result in some conversion of the input feed to the sweet stage. The fractionation tower 150 can be used to remove lower boiling fractions from the final product. In the configuration shown in FIG. 1, adsorbent bed 171 is used to adsorb aromatics from an intermediate boiling range product, his could correspond to a block processing situation where the input feed to the sweet stage corresponds to a bright stock feed. The fractionation tower 150 can be used to separate a light neutral fraction 153 and a heavy neutral fraction 155 from the bright stock fraction 157. In the configuration shown in FIG. 1, the adsorbent 171 is used to remove heavy polynuclear aromatics from the heavy neutral fraction 155. This can potentially reduce the amount of hydroprocessed effluent that needs to be exposed to the adsorbent under aromatic adsorption conditions. Additionally or alternately, because hydroprocessing has been completed, the pressure of the effluent for adsorbent 171 can be lower without having to incur energy costs for subsequent re-pressurization of the effluent. However, if it is desirable to incorporate a solvent into the heavy neutral fraction 155 to facilitate adsorption, an additional separation stage (not shown) would need to be added to remove such solvent from the heavy neutral base stock product.

One advantage of a configuration that includes adsorbent 171 is that the resulting base stock fraction (heavy neutral or bright stock) can be at a reduced temperature prior to entering the adsorbent, since sweet stage hydroprocessing and subsequent fractionation have been completed. However, the reduced temperature means that the base stock fraction can have a correspondingly higher dynamic viscosity. For a heavy neutral fraction passing through adsorbent 171, a suitable adsorbent temperature can be 100° C., which would correspond to a dynamic viscosity of between 8.0 cP and 15 cP (depending on how the heavy neutral fraction is cut). For a bright stock fraction passing through adsorbent 171, the dynamic viscosity at 100° C. can often be 30 cP or more, which can potentially slow the removal of polynuclear aromatics in the adsorbent. Thus, longer residence times may be beneficial for exposing a bright stock to an adsorbent and/or it may be desirable to expose a bright stock to the adsorbent at a higher temperature, such as 150° C. or more, or 200° C. or more, such as up to 300° C. or possibly still higher. As noted above, introducing a solvent to reduce the dynamic viscosity may be less preferable for adsorbent 171, since adsorbent 171 is located after the final separator in the separation stage.

It is noted that adsorbent 171 is located within the conduit from fractionation tower to a holding tank. As an alternative, adsorbent 171 could instead be located in a recirculation loop (not shown) associated with a holding tank. Still another alternative could be to place adsorbent 171 in the location shown and to include an additional adsorbent in a recirculation loop associated with a holding tank.

A configuration that includes adsorbent 172 and/or adsorbent 173 corresponds to a configuration where the heavy polynuclear aromatics are removed after hydroprocessing is finished but prior to fractionation to form desired base stock products. At these positions, the hydroprocessed effluent substantially corresponds to a liquid phase effluent, due to removal of gas phase compounds by gas-liquid separator 142 and/or gas-liquid separator 144. Additionally, because fractionation tower 150 is located after adsorbent 172 and/or adsorbent 173, a solvent or diluent can be introduced into the effluent prior to adsorption. This can allow for modification of the viscosity of the input stream to the adsorbent. In some aspects, an input stream to an adsorbent 173 can be at a slightly lower temperature than an input stream to an adsorbent 172, which can reduce the amount of cooling and re-heating that needs to be performed due to the adsorption process. The pressure of the hydroprocessed effluent after gas-liquid separator 142 and/or gas-liquid separator 144 can also be reduced relative to the typical pressures in a hydroprocessing environment. This can allow adsorbent 172 and/or adsorbent 173 to be housed in a housing with a reduced wall thickness relative to the wall thickness that may be needed for adsorbent 174, adsorbent 175, and/or adsorbent 176.

A configuration that includes adsorbent 174 corresponds to a configuration where the heavy polynuclear aromatics are removed after hydrotreating/hydrocracking 110 and after catalytic dewaxing 120, but prior to hydrofinishing 130. At this location the (partially) hydroprocessed effluent can correspond to a mixed phase due to $H_2$ added to facilitate hydroprocessing as well as due to light ends generated during hydroprocessing. Removing heavy polynuclear aromatics using adsorbent 174 could potentially improve the operation of hydrofinishing 130. Optionally, a diluent or solvent can be added prior to passing the (partially) hydroprocessed effluent in to adsorbent 174, in order to achieve a desired viscosity. However, such a diluent would then also be passed into hydrofinishing 130. Optionally, a gas-liquid separator could be included prior to adsorbent 174, but this can increase the operational cost due to the need to re-pressurize the effluent after adsorption as well as the need to add additional hydrogen to facilitate the hydrofinishing 130.

An effluent at the location of adsorbent 172, 173, or 174 can typically be at a temperature of 200° C. to 250° C. In some aspects, the effluent is exposed to the adsorbent at the combination of temperature and pressure expected at adsorbent location 172, 173, or 174. In some aspects, a temperature of 200° C. to 250° C. is above the typical temperature for exposure to the adsorbent, so some cooling and then re-heating may be needed. The effluent at the location of adsorbent 172, 173, or 174 can have a viscosity near 1.0 cP, with slightly higher viscosities for an effluent generated during bright stock block processing and slightly lower viscosities for an effluent generated during heavy neutral block processing. Without being bound by any particular theory, it is believed that the similar viscosities at the locations of adsorbents 172, 173, and 174 during heavy neutral and bright stock processing can be due to additional cracking performed for formation of bright stock. The additional cracking can lead to additional formation of lower boiling components that can act as a low viscosity diluent.

A configuration that includes adsorbent 175 corresponds to a configuration where the heavy polynuclear aromatics are removed after hydrotreating/hydrocracking 110, but prior to catalytic dewaxing 120 and hydrofinishing 130. At this location the (partially) hydroprocessed effluent can correspond to a mixed phase due to $H_2$ added to facilitate hydroprocessing as well as due to light ends generated during hydroprocessing. Because the hydrotreated/hydrocracked effluent from hydrotreating/hydrocracking 110 may contain a higher amount of waxy molecules, the adsorbing conditions for adsorbent 175 may correspond to a higher temperature range in order to reduce the viscosity of the input stream to the adsorbent. Optionally, a diluent or solvent can be added prior to passing the (partially) hydroprocessed effluent in to adsorbent 175, in order to achieve a desired viscosity. However, such a diluent would then also be passed into catalytic dewaxing 120 and hydrofinishing 130. Optionally, a gas-liquid separator could be included prior to adsorbent 175, but this can increase the operational cost due to the need to re-pressurize the effluent after adsorption as well as the need to add additional hydrogen to facilitate catalytic dewaxing 120 and hydrofinishing 130.

An effluent at the location of adsorbent 175 can typically be at a temperature of 300° C. to 360° C. This is above the typical temperature for exposure to an adsorbent, so some cooling and then re-heating may be needed. The effluent at the location of adsorbent 175 can have a viscosity below 1.0 cP, with slightly higher viscosities for an effluent generated during bright stock block processing and slightly lower viscosities for an effluent generated during heavy neutral block processing.

A configuration that includes adsorbent 176 corresponds to a configuration where the heavy polynuclear aromatics are removed prior to hydrotreating/hydrocracking 110, catalytic dewaxing 120, and hydrofinishing 130. At this location the feed has not started sweet stage hydroprocessing. Based on prior separations from the sour stage, the feed can correspond to a liquid feed, and temperature and pressure can be selected as desired prior to heating and/or repressurization for introduction into hydrotreating/hydrocracking 110. Although the entire feed to the sweet stage is exposed to adsorbent 110, removal of aromatics prior to the start of hydroprocessing can potentially improve the operation of the hydroprocessing stages. This could potentially allow, for example, an increase in the space velocity in the subsequent hydroprocessing reactors while still achieving desired product quality targets. Such a decrease in reaction severity can be beneficial for reducing or minimizing the creation of additional aromatics during hydroprocessing.

One advantage of including adsorbent 176 can be that the input feed to the adsorbent can be at a reduced temperature prior to entering the adsorbent, since sweet stage processing has not started yet. This may involve cooling of a fraction derived from a fractionation tower after the sour stage. However, the reduced temperature means that the input feed can have a correspondingly higher dynamic viscosity. For a heavy neutral fraction passing through adsorbent 176, a suitable adsorbent temperature can be 100° C., which would correspond to a dynamic viscosity of between 8.0 cP and 15 cP (depending on how the heavy neutral fraction is cut). For a bright stock fraction passing through adsorbent 176, the dynamic viscosity at 100° C. can often be cP or more, which can potentially slow the removal of polynuclear aromatics in the adsorbent. Thus, longer residence times may be beneficial for exposing a bright stock to an adsorbent and/or it may be desirable to expose a bright stock to the adsorbent at a higher temperature, such as 150° C. or more, or 200° C. or more, such as up to 300° C. or possibly still higher.

Configuration Example

Figure 2:
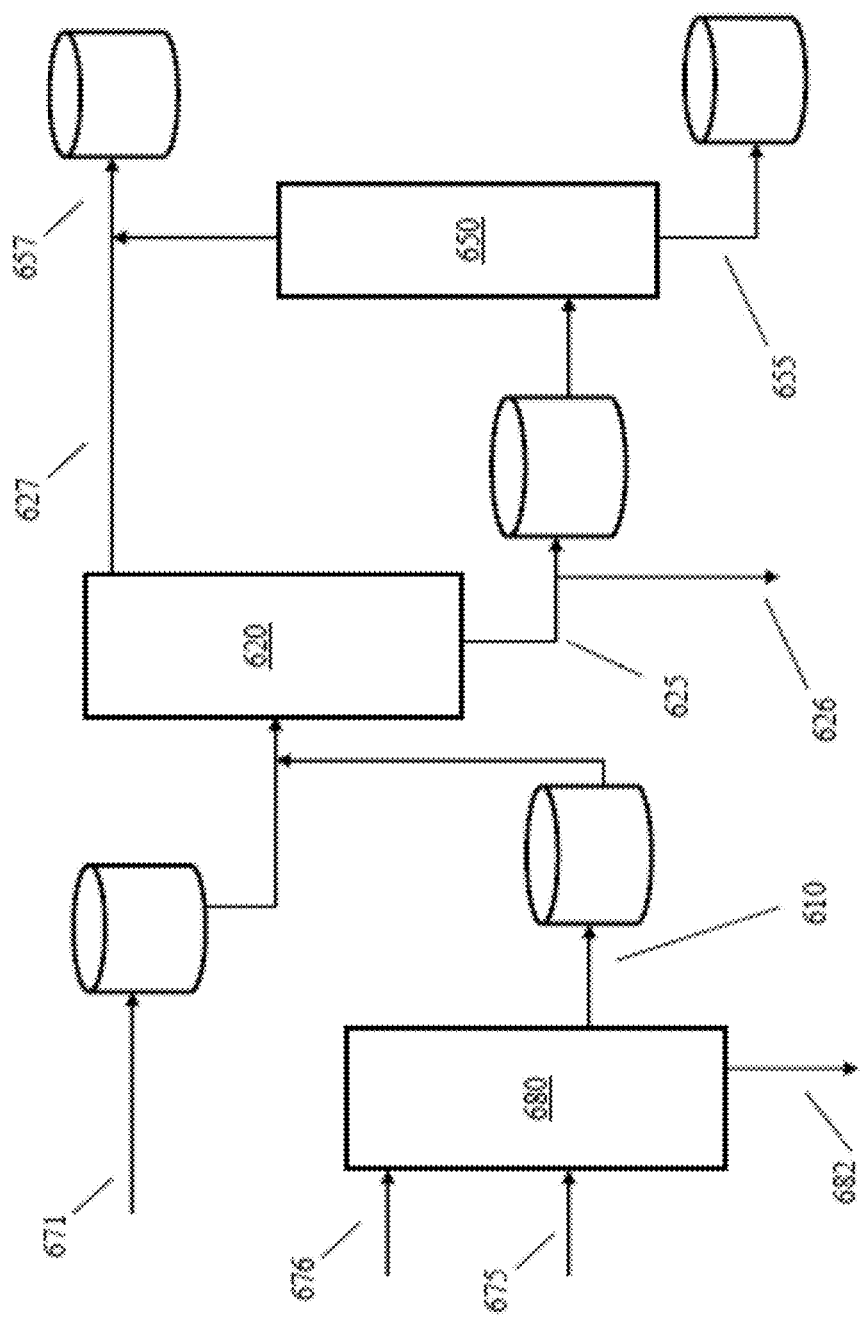
FIG. 2 schematically shows an example of a configuration for catalytic processing of deasphalted oil to form lubricant base stocks.

FIG. 2 schematically shows a general configuration for producing base stocks from a deasphalted oil feed, possibly including a heavy neutral base stock and/or a bright stock. The configuration shown in FIG. 2 represents the sour hydroprocessing stage 620 and the sweet hydroprocessing stage 650 as single elements, but it is understood that these stages can include any convenient number of reactors and/or catalysts. In FIG. 2, a vacuum resid feed 675 and a deasphalting solvent 676 are passed into a deasphalting unit 680. In some aspects, a $C_{4+}$ solvent can be used. Deasphalting unit 680 can produce a rock or asphalt fraction 682 and a deasphalted oil 610. Optionally, deasphalted oil 610 can be combined with another vacuum gas oil boiling range feed 671 prior to being introduced into first (sour) hydroprocessing stage 620. A lower boiling portion 627 of the effluent from hydroprocessing stage 620 can be separated out for further use and/or processing as one or more naphtha fractions and/or distillate fractions. A higher boiling portion 625 of the hydroprocessing effluent can be a) passed into a second (sweet)hydroprocessing stage 650 and/or b) withdrawn 626 from the processing system for use as a fuel, such as a fuel oil or fuel oil blendstock. Second hydroprocessing stage 650 can produce an effluent that can be separated to form one or more fuels fractions 657 and one or more lubricant base stock fractions 655, such as one or more bright stock fractions. It is noted that the sample configuration shown in FIG. 1 can correspond to a second hydroprocessing stage 650.

Feedstocks

In various aspects, at least a portion of a feedstock for processing as described herein can correspond to a vacuum resid fraction or another type 950° F.+(510° C.+) or 1000° F.+(538° C.+) fraction. Another example of a method for forming a 950° F.+(510° C.+) or 1000° F.+(538° C.+) fraction is to perform a high temperature flash separation. The 950° F.+(510° C.+) or 1000° F.+(538° C.+) fraction formed from the high temperature flash can be processed in a manner similar to a vacuum resid.

A vacuum resid fraction or a 950° F.+(510° C.+) fraction formed by another process (such as a flash fractionation bottoms or a bitumen fraction) can be deasphalted at low severity to form a deasphalted oil. Optionally, the feedstock can also include a portion of a conventional feed for lubricant base stock production, such as a vacuum gas oil.

A vacuum resid (or other 510° C.+) fraction can correspond to a fraction with a T5 distillation point (ASTM D2892, or ASTM D7169 if the fraction will not completely elute from a chromatographic system) of at least 900° F. (482° C.), or at least 950° F. (510° C.), or at least 1000° F. (538° C.). Alternatively, a vacuum resid fraction can be characterized based on a T10 distillation point (ASTM D2892/D7169) of at least 900° F. (482° C.), or at least 950° F. (510° C.), or at least 1000° F. (538° C.).

Resid (or other 510° C.+) fractions can be high in metals. For example, a resid fraction can be high in total nickel, vanadium and iron contents. In an aspect, a resid fraction can contain at least 0.00005 grams of Ni/V/Fe (50 wppm) or at least 0.0002 grams of Ni/V/Fe (200 wppm) per gram of resid, on a total elemental basis of nickel, vanadium and iron. In other aspects, the heavy oil can contain at least 500 wppm of nickel, vanadium, and iron, such as up to 1000 wppm or more.

Contaminants such as nitrogen and sulfur are typically found in resid (or other 510° C.+) fractions, often in organically-bound form. Nitrogen content can range from 50 wppm to 10,000 wppm elemental nitrogen or more, based on total weight of the resid fraction. Sulfur content can range from 500 wppm to 100,000 wppm elemental sulfur or more, based on total weight of the resid fraction, or from 1000 wppm to 50,000 wppm, or from 100 wppm to 30,000 wppm.

Still another method for characterizing a resid (or other 510° C.+) fraction is based on the Conradson carbon residue (CCR) of the feedstock. The Conradson carbon residue of a resid fraction can be at least 5 wt %, such as at least 10 wt % or at least 20 wt %. Additionally or alternately, the Conradson carbon residue of a resid fraction can be 50 wt % or less, such as 40 wt % or less or 30 wt % or less.

In some aspects, a vacuum gas oil fraction can be co-processed with a deasphalted oil. The vacuum gas oil can be combined with the deasphalted oil in various amounts ranging from 20 parts (by weight) deasphalted oil to 1 part vacuum gas oil (i.e., 20:1) to 1 part deasphalted oil to 1 part vacuum gas oil. A feed with a 1:1 ratio of deasphalted oil to vacuum gas oil can correspond to, for example, a feed with a T50 distillation point of 510° C. or more. In some aspects, the ratio of deasphalted oil to vacuum gas oil can be at least 1:1 by weight, or at least 1.5:1, or at least 2:1. Typical (vacuum) gas oil fractions can include, for example, fractions with a T5 distillation point to T95 distillation point of 650° F. (343° C.)-1050° F. (566° C.), or 650° F. (343° C.)-1000° F. (538° C.), or 650° F. (343° C.)-950° F. (510° C.), or 650° F. (343° C.)-900° F. (482° C.), or ~700° F. (370° C.)-1050° F. (566° C.), or ~700° F. (370° C.)-1000° F. (538° C.), or ~700° F. (370° C.)-950° F. (510° C.), or ~700° F. (370° C.)-900° F. (482° C.), or 750° F. (399° C.)-1050° F. (566° C.), or 750° F. (399° C.)-1000° F. (538° C.), or 750° F. (399° C.)-950° F. (510° C.), or 750° F. (399° C.)-900° F. (482° C.). For example a suitable vacuum gas oil fraction can have a T5 distillation point of at least 343° C. and a T95 distillation point of 566° C. or less; or a T10 distillation point of at least 343° C. and a T90 distillation point of 566° C. or less; or a T5 distillation point of at least 370° C. and a T95 distillation point of 566° C. or less; or a T5 distillation point of at least 343° C. and a T95 distillation point of 538° C. or less.

Solvent Deasphalting

Solvent deasphalting is a solvent extraction process. In some aspects, suitable solvents for methods as described herein include alkanes or other hydrocarbons (such as alkenes) containing 4 to 7 carbons per molecule. Examples of suitable solvents include n-butane, isobutane, n-pentane, $C_{4+}$ alkanes, $C_{5+}$ alkanes, $C_{4+}$ hydrocarbons, and $C_{5+}$ hydrocarbons. In other aspects, suitable solvents can include $C_3$ hydrocarbons, such as propane. In such other aspects, examples of suitable solvents include propane, n-butane, isobutane, n-pentane, $C_{3+}$ alkanes, $C_{4+}$ alkanes, $C_{5+}$ alkanes, $C_3+$ hydrocarbons, $C_{4+}$ hydrocarbons, and $C_{5+}$ hydrocarbons In this discussion, a solvent comprising $C_n$ (hydrocarbons) is defined as a solvent composed of at least 80 wt % of alkanes (hydrocarbons) having n carbon atoms, or at least 85 wt %, or at least 90 wt %, or at least 95 wt %, or at least 98 wt %. Similarly, a solvent comprising $C_{n+}$ (hydrocarbons) is defined as a solvent composed of at least 80 wt % of alkanes (hydrocarbons) having n or more carbon atoms, or at least 85 wt %, or at least 90 wt %, or at least 95 wt %, or at least 98 wt %.

In this discussion, a solvent comprising $C_n$ alkanes (hydrocarbons) is defined to include the situation where the solvent corresponds to a single alkane (hydrocarbon) containing n carbon atoms (for example, n=3, 4, 5, 6, 7) as well as the situations where the solvent is composed of a mixture of alkanes (hydrocarbons) containing n carbon atoms. Similarly, a solvent comprising $C_{n+}$ alkanes (hydrocarbons) is defined to include the situation where the solvent corresponds to a single alkane (hydrocarbon) containing n or more carbon atoms (for example, n=3, 4, 5, 6, 7) as well as the situations where the solvent corresponds to a mixture of alkanes (hydrocarbons) containing n or more carbon atoms. Thus, a solvent comprising $C_{4+}$ alkanes can correspond to a solvent including n-butane; a solvent including n-butane and isobutane; a solvent including n-pentane; a solvent corresponding to a mixture of one or more butane isomers and one or more pentane isomers; or any other convenient combination of alkanes containing 4 or more carbon atoms. Similarly, a solvent comprising $C_{5+}$ alkanes (hydrocarbons) is defined to include a solvent corresponding to a single alkane (hydrocarbon) or a solvent corresponding to a mixture of alkanes (hydrocarbons) that contain 5 or more carbon atoms. Alternatively, other types of solvents may also be suitable, such as supercritical fluids. In various aspects, the solvent for solvent deasphalting can consist essentially of hydrocarbons, so that at least 98 wt % or at least 99 wt % of the solvent corresponds to compounds containing only carbon and hydrogen. In aspects where the deasphalting solvent corresponds to a $C_{4+}$ deasphalting solvent, the $C_{4+}$ deasphalting solvent can include less than 15 wt % propane and/or other $C_3$ hydrocarbons, or less than 10 wt %, or less than 5 wt %, or the $C_4$ deasphalting solvent can be substantially free of propane and/or other $C_3$ hydrocarbons (less than 1 wt %). In aspects where the deasphalting solvent corresponds to a $C_{5+}$ deasphalting solvent, the $C_{5+}$ deasphalting solvent can include less than 15 wt % propane, butane and/or other $C_3$-$C_4$ hydrocarbons, or less than 10 wt %, or less than 5 wt %, or the $C_{5+}$ deasphalting solvent can be substantially free of propane, butane, and/or other $C_3$-$C_4$ hydrocarbons (less than 1 wt %). In aspects where the deasphalting solvent corresponds to a $C_{3+}$ deasphalting solvent, the $C_3+$ deasphalting solvent can include less than 10 wt % ethane and/or other $C_2$ hydrocarbons, or less than 5 wt %, or the $C_3+$ deasphalting solvent can be substantially free of ethane and/or other $C_2$ hydrocarbons (less than 1 wt %).

Deasphalting of heavy hydrocarbons, such as vacuum resids, is known in the art and practiced commercially. A deasphalting process typically corresponds to contacting a heavy hydrocarbon with an alkane solvent (propane, butane, pentane, hexane, heptane etc and their isomers), either in pure form or as mixtures, to produce two types of product streams. One type of product stream can be a deasphalted oil extracted by the alkane, which is further separated to produce deasphalted oil stream. A second type of product stream can be a residual portion of the feed not soluble in the solvent, often referred to as rock or asphaltene fraction. The deasphalted oil fraction can be further processed into make fuels or lubricants. The rock fraction can be further used as blend component to produce asphalt, fuel oil, and/or other products. The rock fraction can also be used as feed to gasification processes such as partial oxidation, fluid bed combustion or coking processes. The rock can be delivered to these processes as a liquid (with or without additional components) or solid (either as pellets or lumps).

During solvent deasphalting, a resid boiling range feed (optionally also including a portion of a vacuum gas oil feed) can be mixed with a solvent. Portions of the feed that are soluble in the solvent are then extracted, leaving behind a residue with little or no solubility in the solvent. The portion of the deasphalted feedstock that is extracted with the solvent is often referred to as deasphalted oil. Typical solvent deasphalting conditions include mixing a feedstock fraction with a solvent in a weight ratio of from 1:2 to 1:10, such as 1:8 or less. Typical solvent deasphalting temperatures range from 40° C. to 200° C., or 40° C. to 150° C., depending on the nature of the feed and the solvent. The pressure during solvent deasphalting can be from 50 psig (345 kPag) to 500 psig (3447 kPag).

It is noted that the above solvent deasphalting conditions represent a general range, and the conditions will vary depending on the feed. For example, under typical deasphalting conditions, increasing the temperature can tend to reduce the yield while increasing the quality of the resulting deasphalted oil. Under typical deasphalting conditions, increasing the molecular weight of the solvent can tend to increase the yield while reducing the quality of the resulting deasphalted oil, as additional compounds within a resid fraction may be soluble in a solvent composed of higher molecular weight hydrocarbons. Under typical deasphalting conditions, increasing the amount of solvent can tend to increase the yield of the resulting deasphalted oil. As understood by those of skill in the art, the conditions for a particular feed can be selected based on the resulting yield of deasphalted oil from solvent deasphalting. In aspects where a $C_2$ deasphalting solvent is used, the yield from solvent deasphalting can be 40 wt % or less. In some aspects, $C_4$ deasphalting can be performed with a yield of deasphalted oil of 50 wt % or less, or 40 wt % or less. In various aspects, the yield of deasphalted oil from solvent deasphalting with a $C_{4+}$ solvent can be at least 50 wt % relative to the weight of the feed to deasphalting, or at least 55 wt %, or at least 60 wt % or at least 65 wt %, or at least 70 wt %. In aspects where the feed to deasphalting includes a vacuum gas oil portion, the yield from solvent deasphalting can be characterized based on a yield by weight of a 950° F.+(510° C.) portion of the deasphalted oil relative to the weight of a 510° C.+ portion of the feed. In such aspects where a $C_{4+}$ solvent is used, the yield of 510° C.+ deasphalted oil from solvent deasphalting can be at least 40 wt % relative to the weight of the 510° C.+ portion of the feed to deasphalting, or at least 50 wt %, or at least 55 wt %, or at least 60 wt % or at least 65 wt %, or at least 70 w %. In such aspects where a $C_{4+}$ solvent is used, the yield of 510° C.+ deasphalted oil from solvent deasphalting can be 50 wt % or less relative to the weight of the 510° C.+ portion of the feed to deasphalting, or 40 wt % or less, or 35 wt % or less.

Hydrotreating and Hydrocracking

After deasphalting, the deasphalted oil (and any additional fractions combined with the deasphalted oil) can undergo further processing to form lubricant base stocks. This can include hydrotreatment and/or hydrocracking to remove heteroatoms to desired levels, reduce Conradson Carbon content, and/or provide viscosity index (VI) uplift. Depending on the aspect, a deasphalted oil can be hydroprocessed by hydrotreating, hydrocracking, or hydrotreating and hydrocracking. Optionally, one or more catalyst beds and/or stages of demetallization catalyst can be included prior to the initial bed of hydrotreating and/or hydrocracking catalyst. Optionally, the hydroprocessing can further include exposing the deasphalted oil to a base metal aromatic saturation catalyst. It is noted that a base metal aromatic saturation catalyst can sometimes be similar to a lower activity hydrotreating catalyst.

The deasphalted oil can be hydrotreated and/or hydrocracked with little or no solvent extraction being performed prior to and/or after the deasphalting. As a result, the deasphalted oil feed for hydrotreatment and/or hydrocracking can have a substantial aromatics content. In various aspects, the aromatics content of the deasphalted oil feed can be at least 50 wt %, or at least 55 wt %, or at least 60 wt %, or at least 65 wt %, or at least 70 wt %, or at least 75 wt %, such as up to 90 wt % or more. Additionally or alternatively, the saturates content of the deasphalted oil feed can be 50 wt % or less, or 45 wt % or less, or 40 wt % or less, or 35 wt % or less, or 30 wt % or less, or 25 wt % or less, such as down to 10 wt % or less. In this discussion and the claims below, the aromatics content and/or the saturates content of a fraction can be determined based on ASTM D7419. As noted above, it is believed that this method is suitable for characterization of the aromatics and/or saturates levels described herein.

The reaction conditions during demetallization and/or hydrotreatment and/or hydrocracking of the deasphalted oil (and optional vacuum gas oil co-feed) can be selected to generate a desired level of conversion of a feed. Any convenient type of reactor, such as fixed bed (for example trickle bed) reactors can be used. Conversion of the feed can be defined in terms of conversion of molecules that boil above a temperature threshold to molecules below that threshold. The conversion temperature can be any convenient temperature, such as ~700° F. (370° C.) or 1050° F. (566° C.). The amount of conversion can correspond to the total conversion of molecules within the combined hydrotreatment and hydrocracking stages for the deasphalted oil. Suitable amounts of conversion of molecules boiling above 1050° F. (566° C.) to molecules boiling below 566° C. include 30 wt % to 90 wt % conversion relative to 566° C., or 30 wt % to 80 wt %, or 30 wt % to 70 wt %, or 40 wt % to 90 wt %, or 40 wt % to 80 wt %, or 40 wt % to 70 wt %, or 50 wt % to 90 wt %, or 50 wt % to 80 wt %, or 50 wt % to 70 wt %. In particular, the amount of conversion relative to 566° C. can be 30 wt % to 90 wt %, or 30 wt % to 70 wt % or 50 wt % to 90 wt %. Additionally or alternately, suitable amounts of conversion of molecules boiling above ~700° F. (370° C.) to molecules boiling below 370° C. include 10 wt % to 70 wt % conversion relative to 370° C., or 10 wt % to 60 wt %, or 10 wt % to 50 wt %, or 20 wt % to 70 wt %, or 20 wt % to 60 wt %, or 20 wt % to 50 wt %, or 30 wt % to 70 wt %, or 30 wt % to 60 wt %, or 30 wt % to 50 wt %. In particular, the amount of conversion relative to 370° C. can be 10 wt % to 70 wt %, or 20 wt % to 50 wt %, or 30 wt % to 60 wt %.

The hydroprocessed deasphalted oil can also be characterized based on the product quality. After hydroprocessing (hydrotreating and/or hydrocracking), the hydroprocessed deasphalted oil can have a sulfur content of 200 wppm or less, or 100 wppm or less, or 50 wppm or less (such as down to ~0 wppm). Additionally or alternatively, the hydroprocessed deasphalted oil can have a nitrogen content of 200 wppm or less, or 100 wppm or less, or 50 wppm or less (such as down to ~0 wppm). Additionally or alternatively, the hydroprocessed deasphalted oil can have a Conradson Carbon residue content of 1.5 wt % or less, or 1.0 wt % or less, or 0.7 wt % or less, or 0.1 wt %/or less, or 0.02 wt % or less (such as down to ~0 wt %). Conradson Carbon residue content can be determined according to ASTM D4530.

In various aspects, a feed can initially be exposed to a demetallization catalyst prior to exposing the feed to a hydrotreating catalyst. Deasphalted oils can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

In various aspects, the deasphalted oil can be exposed to a hydrotreating catalyst under effective hydrotreating conditions. The catalysts used can include conventional hydroprocessing catalysts, such as those comprising at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m²/g, or 150 to 250 m²/g; and a pore volume of from 0.25 to 1.0 cm³/g, or 0.35 to 0.8 cm³/g. More generally, any convenient size, shape, and/or pore size distribution for a catalyst suitable for hydrotreatment of a distillate (including lubricant base stock) boiling range feed in a conventional manner may be used. Preferably, the support or carrier material is an amorphous support, such as a refractory oxide. Preferably, the support or carrier material can be free or substantially free of the presence of molecular sieve, where substantially free of molecular sieve is defined as having a content of molecular sieve of less than 0.01 wt %.

The at least one Group VIII non-noble metal, in oxide form, can typically be present in an amount ranging from 2 wt % to 40 wt %, preferably from 4 wt % to 15 wt %. The at least one Group VI metal, in oxide form, can typically be present in an amount ranging from 2 wt % to 70 wt %, preferably for supported catalysts from 6 wt % to 40 wt % or from 10 wt % to 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane). The treat gas stream introduced into a reaction stage will preferably contain at least 50 vol. % and more preferably at least 75 vol. % hydrogen. Optionally, the hydrogen treat gas can be substantially free (less than 1 vol %) of impurities such as $H_2S$ and $NH_3$ and/or such impurities can be substantially removed from a treat gas prior to use.

Hydrogen can be supplied at a rate of from 100 SCF/B (standard cubic feet of hydrogen per barrel of feed) (17 $Nm^3/m^3$) to 10000 SCF/B (1700 $Nm^3/m^3$). Preferably, the hydrogen is provided in a range of from 200 SCF/B (34 $Nm^3/m^3$) to 2500 SCF/B (420 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

In various aspects, the deasphalted oil can be exposed to a hydrocracking catalyst under effective hydrocracking conditions. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophophates. One example of suitable zeolite is USY, such as a USY zeolite with cell size of 24.30 Angstroms or less. Additionally or alternately, the catalyst can be a low acidity molecular sieve, such as a USY zeolite with a Si to Al ratio of at least 20, and preferably at least 40 or 50. ZSM-48, such as ZSM-48 with a $SiO_2$ to $Al_2O_3$ ratio of 110 or less, such as 90 or less, is another example of a potentially suitable hydrocracking catalyst. Still another option is to use a combination of USY and ZSM-48. Still other options include using one or more of zeolite Beta, ZSM-5, ZSM-35, or ZSM-23, either alone or in combination with a USY catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

When only one hydrogenation metal is present on a hydrocracking catalyst, the amount of that hydrogenation metal can be at least 0.1 wt % based on the total weight of the catalyst, for example at least 0.5 wt % or at least 0.6 wt %. Additionally or alternately when only one hydrogenation metal is present, the amount of that hydrogenation metal can be 5.0 wt % or less based on the total weight of the catalyst, for example 3.5 wt % or less, or 2.5 wt % or less, or 1.5 wt % or less, or 1.0 wt % or less, or 0.9 wt % or less, or 0.75 wt % or less, or 0.6 wt % or less. Further additionally or alternately when more than one hydrogenation metal is present, the collective amount of hydrogenation metals can be at least 0.1 wt % based on the total weight of the catalyst, for example at least 0.25 wt %, or at least 0.5 wt %, or at least 0.6 wt %, or at least 0.75 wt %, or at least 1 wt %. Still further additionally or alternately when more than one hydrogenation metal is present, the collective amount of hydrogenation metals can be 35 wt % or less based on the total weight of the catalyst, for example 30 wt % or less, or 25 wt % or less, or 20 wt % or less, or 15 wt % or less, or 10 wt % or less, or 5 wt % or less. In embodiments wherein the supported metal comprises a noble metal, the amount of noble metal(s) is typically less than 2 wt %, for example less than 1 wt %, or 0.9 wt % or less, or 0.75 wt % or less, or 0.6 wt % or less. It is noted that hydrocracking under sour conditions is typically performed using a base metal (or metals) as the hydrogenation metal.

In various aspects, the conditions selected for hydrocracking for lubricant base stock production can depend on the desired level of conversion, the level of contaminants in the input feed to the hydrocracking stage, and potentially other factors. For example, hydrocracking conditions in a single stage, or in the first stage and/or the second stage of a multi-stage system, can be selected to achieve a desired level of conversion in the reaction system. Hydrocracking conditions can be referred to as sour conditions or sweet conditions, depending on the level of sulfur and/or nitrogen present within a feed. For example, a feed with 100 wppm or less of sulfur and 50 wppm or less of nitrogen, preferably less than 25 wppm sulfur and/or less than 10 wppm of nitrogen, represent a feed for hydrocracking under sweet conditions. In various aspects, hydrocracking can be performed on a thermally cracked resid, such as a deasphalted oil derived from a thermally cracked resid. In some aspects, such as aspects where an optional hydrotreating step is used prior to hydrocracking, the thermally cracked resid may correspond to a sweet feed. In other aspects, the thermally cracked resid may represent a feed for hydrocracking under sour conditions.

A hydrocracking process under sour conditions can be carried out at temperatures of 550° F. (288° C.) to 840° F. (449° C.), hydrogen partial pressures of from 1500 psig to 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 1500 psig to 3000 psig (10.3 MPag-20.9 MPag), and hydrogen treat gas rates of from 213 $m^3/m^3$ to 1068 $m^3/m^3$ (1200 SCF/B to 6000 SCF/B). The LHSV can be from 0.25 h to 50 $h^{-1}$, or from 0.5 h to 20 $h^{-1}$ preferably from 1.0 $h^1$ to 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base stocks. In such aspects, the portion boiling above the distillate fuel range is subjected to further hydroprocessing in a second hydroprocessing stage.

A hydrocracking process under sweet conditions can be performed under conditions similar to those used for a sour hydrocracking process, or the conditions can be different. In an embodiment, the conditions in a sweet hydrocracking stage can have less severe conditions than a hydrocracking process in a sour stage. Suitable hydrocracking conditions for a non-sour stage can include, but are not limited to, conditions similar to a first or sour stage. Suitable hydrocracking conditions can include temperatures of 500° F. (260° C.) to 840° F. (449° C.), hydrogen partial pressures of from 1500 psig to 5000 psig (10.3 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 1500 psig to 3000 psig (10.3 MPag-20.9 MPag), and hydrogen treat gas rates of from 213 $m^3/m^3$ to 1068 $m^3/m^3$ (1200 SCF/B 6000 SCF/B). The LHSV can be from 0.25 $h^{-1}$ to 50 $h^{-1}$, or from 0.5 $h^{-1}$ to 20 $h^{-1}$, preferably from 1.0 $h^{-1}$ to 4.0 $h^{-1}$.

In still another aspect, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In yet another aspect, a hydroprocessing reaction system may include more than one hydrocracking stage. If multiple hydrocracking stages are present, at least one hydrocracking stage can have effective hydrocracking conditions as described above, including a hydrogen partial pressure of at least 1500 psig (10.3 MPag). In such an aspect, other hydrocracking processes can be performed under conditions that may include lower hydrogen partial pressures. Suitable hydrocracking conditions for an additional hydrocracking stage can include, but are not limited to, temperatures of 500° F. (260° C.) to 840° F. (449° C.), hydrogen partial pressures of from 250 psig to 5000 psig (1.8 MPag to 34.6 MPag), liquid hourly space velocities of from 0.05 h$^{-1}$ 1 to 10 h$^{-1}$ 1, and hydrogen treat gas rates of from 35.6 m$^3$/m$^3$ to 1781 m$^3$/m$^3$ (200 SCF/B to 10,000 SCF/B). In other embodiments, the conditions for an additional hydrocracking stage can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCFB). The LHSV can be from 0.25 h$^{-1}$ to 50 h$^{-1}$, or from 0.5 h to 20 h, and preferably from 1.0 h$^{-1}$ to 4.0 h$^{-1}$.

Additional Hydroprocessing—Catalytic Dewaxing, Hydrofinishing, and Optional Hydrocracking In various aspects, at least a lubricant boiling range portion of the hydroprocessed deasphalted oil can be exposed to further hydroprocessing (including catalytic dewaxing) to form lubricant base stocks, including Group II and/or Group III heavy neutral base stock and/or bright stock. Optionally, the further hydroprocessing of the lubricant boiling range portion of the hydroprocessed deasphalted oil can also include exposure to hydrocracking conditions before and/or after the exposure to the catalytic dewaxing conditions. As noted above, at this point in the process, the hydrocracking can be considered "sweet" hydrocracking, as the hydroprocessed deasphalted oil can have a sulfur content of 200 wppm or less.

Suitable hydrocracking conditions can include exposing the feed to a hydrocracking catalyst as previously described above. Optionally, it can be preferable to use a USY zeolite with a silica to alumina ratio of at least 30 and a unit cell size of less than 24.32 Angstroms as the zeolite for the hydrocracking catalyst, in order to improve the VI uplift from hydrocracking and/or to improve the ratio of distillate fuel yield to naphtha fuel yield in the fuels boiling range product.

Suitable hydrocracking conditions can also include temperatures of 500° F. (260° C.) to 840° F. (449° C.), hydrogen partial pressures of from 1500 psig to 5000 psig (10.3 MPag to 34.6 MPag), liquid hourly space velocities of from 0.05 h to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 1500 psig to 3000 psig (10.3 MPag-20.9 MPag), and hydrogen treat gas rates of from 213 m$^3$/m$^3$ to 1068 m$^3$/m$^3$ (1200 SCF/B to 6000 SCF/B). The LHSV can be from 0.25 h$^{-1}$ to 50 h$^{-1}$, or from 0.5 W to 20 h$^{-1}$, and preferably from 1.0 h$^4$ to 4.0 h.

For catalytic dewaxing, suitable dewaxing catalysts can include molecular sieves such as crystalline aluminosilicates (zeolites). In an embodiment, the molecular sieve can comprise, consist essentially of, or be ZSM-22, ZSM-23. ZSM-48. Optionally but preferably, molecular sieves that are selective for dewaxing by isomerization as opposed to cracking can be used, such as ZSM-48, ZSM-23, or a combination thereof. Additionally or alternately, the molecular sieve can comprise, consist essentially of, or be a 10-member ring 1-D molecular sieve, such as EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the invention are catalysts with a low ratio of silica to alumina. For example, for ZSM-48, the ratio of silica to alumina in the zeolite can be 100:1 or less, such as 90:1 or less, or 75:1 or less, or 70:1 or less. Additionally or alternately, the ratio of silica to alumina in the ZSM-48 can be at least 50:1, such as at least 60:1, or at least 65:1.

In various embodiments, the catalysts according to the invention further include a metal hydrogenation component. The metal hydrogenation component is typically a Group VI and/or a Group VIII metal. Preferably, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.5 wt %, or at least 1.0 wt %, or at least 2.5 wt %, or at least 5.0 wt %, based on catalyst. The amount of metal in the catalyst can be 20 wt % or less based on catalyst, or 10 wt % or less, or 5 wt % or less, or 2.5 wt % or less, or 1 wt % or less. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the invention can also include a binder. In some embodiments, the dewaxing catalysts used in process according to the invention are formulated using a low surface area binder, a low surface area binder represents a binder with a surface area of 100 m$^2$/g or less, or 80 m$^2$/g or less, or 70 m$^2$/g or less. Additionally or alternately, the binder can have a surface area of at least 25 m$^2$/g. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %.

Without being bound by any particular theory, it is believed that use of a low surface area binder reduces the amount of binder surface area available for the hydrogenation metals supported on the catalyst, his leads to an increase in the amount of hydrogenation metals that are supported within the pores of the molecular sieve in the catalyst.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Effective conditions for catalytic dewaxing of a feedstock in the presence of a dewaxing catalyst can include a temperature of from 280° C. to 450° C., preferably 343° C. to 435° C., a hydrogen partial pressure of from 3.5 MPag to 34.6 MPag (500 psig to 5000 psig), preferably 4.8 MPag to 20.8 MPag, and a hydrogen circulation rate of from 178 m$^3$/m$^3$ (1000 SCF/B) to 1781 m$^3$/m$^3$ (10,000 scf/B), preferably 213 m$^3$/m$^3$ (1200 SCF/B) to 1068 m$^3$/m$^3$ (6000 SCF/B). The LHSV can be from 0.2 h to 10 h, such as from 0.5 h$^{-1}$ to 5 h and/or from 1 h$^{-1}$ to 4 h.

Before and/or after catalytic dewaxing, the hydroprocessed deasphalted oil (i.e., at least a lubricant boiling range portion thereof) can optionally be exposed to an aromatic saturation catalyst, which can alternatively be referred to as a hydrofinishing catalyst. Exposure to the aromatic saturation catalyst can occur either before or after fractionation. If aromatic saturation occurs after fractionation, the aromatic saturation can be performed on one or more portions of the fractionated product. Alternatively, the entire effluent from the last hydrocracking or dewaxing process can be hydrofinished and/or undergo aromatic saturation.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. For supported hydrotreating catalysts, suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from 125° C. to 425° C. preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 hr$^{-1}$ to 5 hr$^{-1}$ LHSV, preferably 0.5 hr$^{-1}$ to 1.5 hr$^{-1}$. Additionally, a hydrogen treat gas rate of from 35.6 m$^3$/m$^3$ to 1781 m$^3$/m$^3$ (200 SCF/B to 10,000 SCF/B) can be used.

Lubricating Oil Additives

A formulated lubricating oil useful in the present disclosure may contain one or more of the other commonly used lubricating oil performance additives including but not limited to antiwear additives, detergents, dispersants, viscosity modifiers, corrosion inhibitors, rust inhibitors, metal deactivators, extreme pressure additives, anti-seizure agents, wax modifiers, other viscosity modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see "Lubricant Additives, Chemistry and Applications", Ed. L. R. Rudnick, Marcel Dekker, Inc. 270 Madison Ave. New York, N.J. 10016, 2003, and Klamann in Lubricants and Related Products, Verlag Chemie, Deerfield Beach, Fla.: ISBN 0-89573-177-0. Reference is also made to "Lubricant Additives" by M. W. Ranney, published by Noyes Data Corporation of Parkridge, N.J. (1973); see also U.S. Pat. No. 7,704,930, the disclosure of which is incorporated herein in its entirety. These additives are commonly delivered with varying amounts of diluent oil that may range from 5 weight percent to 50 weight percent.

The additives useful in this disclosure do not have to be soluble in the lubricating oils. Insoluble additives such as zinc stearate in oil can be dispersed in the lubricating oils of this disclosure.

When lubricating oil compositions contain one or more additives, the additive(s) are blended into the composition in an amount sufficient for it to perform its intended function. Additives are typically present in lubricating oil compositions as a minor component, typically in an amount of less than 50 weight percent, preferably less than 30 weight percent, and more preferably less than 15 weight percent, based on the total weight of the composition. Additives are most often added to lubricating oil compositions in an amount of at least 0.1 weight percent, preferably at least 1 weight percent, more preferably at least 5 weight percent. Typical amounts of such additives useful in the present disclosure are shown in Table I below.

It is noted that many of the additives are shipped from the additive manufacturer as a concentrate, containing one or more additives together, with a certain amount of base oil diluents. Accordingly, the weight amounts in the Table I below, as well as other amounts mentioned herein, are directed to the amount of active ingredient (that is the non-diluent portion of the ingredient). The weight percent (wt %) indicated below is based on the total weight of the lubricating oil composition.

TABLE 1

Typical Amounts of Other Lubricating Oil Components

| Compound | Approximate wt % (Useful) | Approximate wt % (Preferred) |
|---|---|---|
| Dispersant | 0.1-20 | 0.1-8 |
| Detergent | 0.1-20 | 0.1-8 |
| Friction Modifier | 0.01-5 | 0.01-1.5 |
| Antioxidant | 0.1-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lube base stocks of the present disclosure are well suited as lube base stocks without blending limitations, and further, the lube base stock products are also compatible with lubricant additives for lubricant formulations. The lube base stocks of the present disclosure can optionally be blended with other lube base stocks to form lubricants. Useful cobase lube stocks include Group I, III, IV and V base stocks and gas-to-liquid (GTL) oils. One or more of the cobase stocks may be blended into a lubricant composition including the lube base stock at from 0.1 to 50 wt. %, or 0.5 to 40 wt. %, 1 to 35 wt. %, or 2 to 30 wt. %, or 5 to 25 wt. %, or 10 to 20 wt. %, based on the total lubricant composition.

The lube base stocks and lubricant compositions can be employed in the present disclosure in a variety of lubricant-related end uses, such as a lubricant oil or grease for a device or apparatus requiring lubrication of moving and/or inter-acting mechanical parts, components, or surfaces. Useful apparatuses include engines and machines. The lube base stocks of the present disclosure are most suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants, metal working fluids.

Integration with UV-Visible Absorption Spectroscopy

In some aspects, two separate light sources can be included in a configuration. A first light source can correspond to a UV-Visible light source, while a second light source can correspond to the fluorescence light source. In such aspects, the UV-Visible light source can be used to determine an excitation signal intensity for the fluorescence light source so that a suitable level of emission occurs.

Regardless of aromatic content, lubricant base stocks can tend to have variable transmission properties for incident visible light. As a result, determining the appropriate intensity of excitation light for fluorescence spectroscopy can be difficult. If too little intensity is used, too little excitation will occur, and the resulting emitted light from fluorescence will not be detectable. If too much excitation intensity is used, the fluorescence transitions may become fully saturated, so that the relative quantities of the polynuclear aromatic compounds will not be available.

It has been discovered that UV-Visible spectroscopy can be used to overcome the difficulties associated with determining the excitation intensity level for fluorescence spectroscopy. In fluorescence spectroscopy, the desired fluorescence emission is produced by a relatively slow transition. This means that information can be lost as the fluorescence absorption transitions become fully saturated. By contrast, saturation of absorption transitions is desirable for UV-Visible spectroscopy, as the desired signal corresponds to the amount of incident light that is absorbed. Because UV-Visible spectroscopy is dependent on absorption, a desirable level of incident light for UV-Visible spectroscopy is a sufficient amount of light intensity so that at least part of the incident wavelength is detectable, and differences can be detected between different incident wavelengths. Once an appropriate intensity is determined for UV-Visible spectroscopy, the intensity can be scaled to determine the excitation intensity for fluorescence.

As a practical matter, rather than varying the signal intensity, another option can be to vary an amount of dilution for the sample. When a measurement is desired, a sample can be withdrawn from a processing system at a representative location, such as by withdrawing a sample into a side conduit. Such a side conduit can be selected to enable a desirable path length for the UV-Visible spectroscopy measurement, such as a path length of roughly 1 cm. The sample is then diluted with solvent that does not absorb in the desired spectroscopy window, such as cyclohexane. The amount of dilution can be determined by testing various dilution amounts under UV-Visible spectroscopy conditions. After an appropriate dilution amount is determined, the fluorescence spectroscopy can be performed using the substantially the same level of dilution.

Another advantage of using UV-Visible spectroscopy to determine the level of dilution for a sample is that the sample analysis can be automated. As an initial step, after a sample is withdrawn from the base stock production system, a series of UV-Visible spectra can be obtained at various levels of dilution until a dilution level is found that results in a transmitted signal within a defined intensity window. Such a dilution level can be found using any convenient automated method. After determining the dilution level, a fluorescence intensity can be obtained at a single wavelength and/or a fluorescence spectrum can be obtained, such as a fluorescence excitation-emission matrix spectrum.

Figure 5:
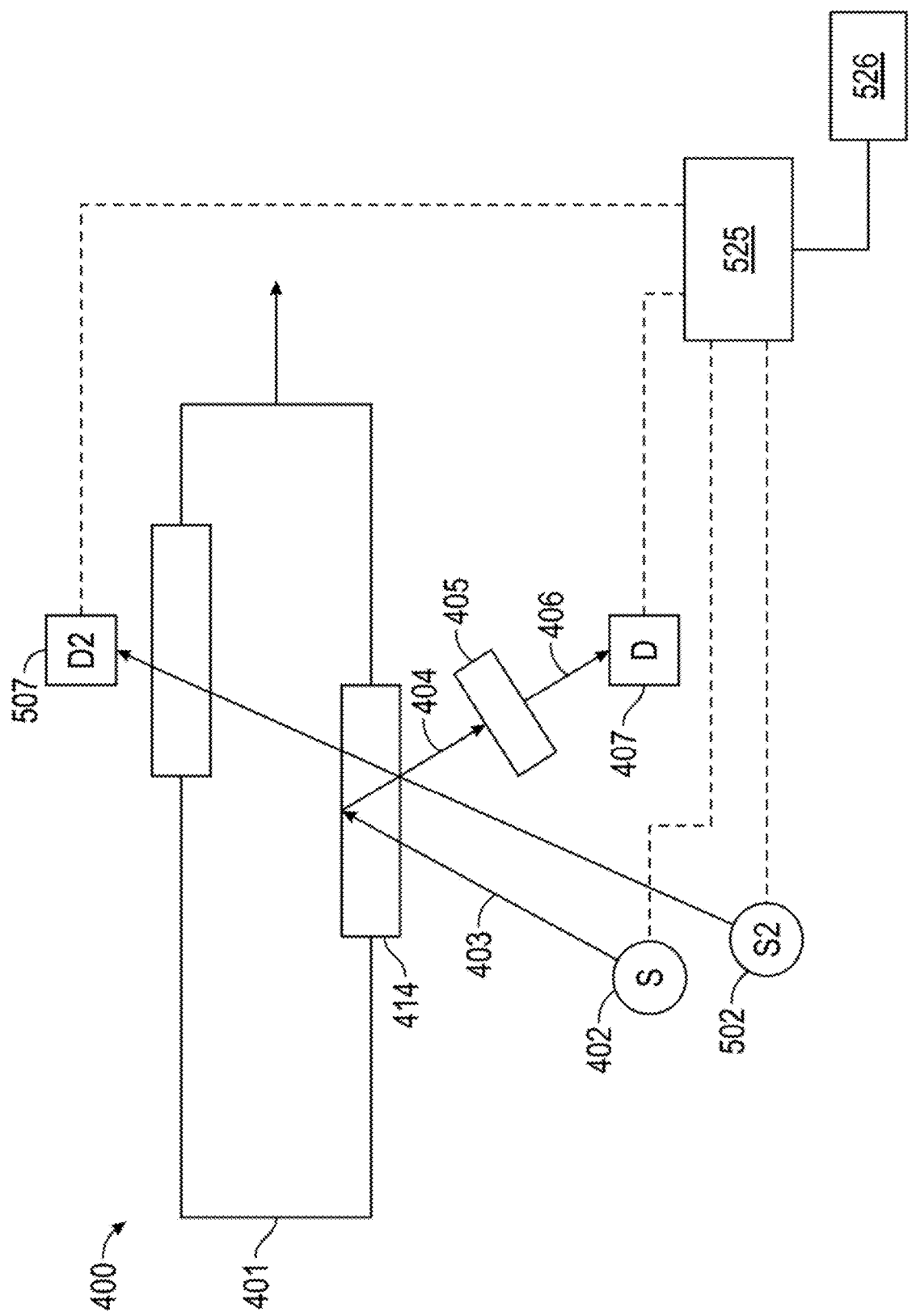
FIG. 5 shows another example of a system for integrating optical spectroscopy with a lubricant production process.

In some aspects, a measurement system can correspond to an automated system, so that a fluorescent measurement can be obtained without requiring an operator. FIG. 5 shows an example of such a configuration. In FIG. 5, the components shown in FIG. 4 are present. A second light source 502 is also present, to provide a UV-Visible light source. The light source 402 and the second light source 502 can be controlled by a processor 525 that has an associated memory 526 that stores computer-executable instructions for performing an automated measurement. The processor 525 can also control the optical transducer 407 for receiving fluorescent emission as well as second optical transducer 507 for receiving the UV-Visible light that is not adsorbed.

During operation of the configuration shown in FIG. 5, the processor 525 can automatically vary the intensity of second light source 502 until a desired signal strength is received at second optical transducer 507. The processor can then select a corresponding intensity for light source 402 to perform fluorescence spectroscopy.

In alternative aspects, instead of varying the intensity of the second light source, the processor can automatically vary a dilution level for the sample until a desired signal strength is received at the second optical transducer. The processor can then select a corresponding dilution level to perform the fluorescence spectroscopy.

Example: Constructing a Representation Using a Model Compound Library

Figure 6:
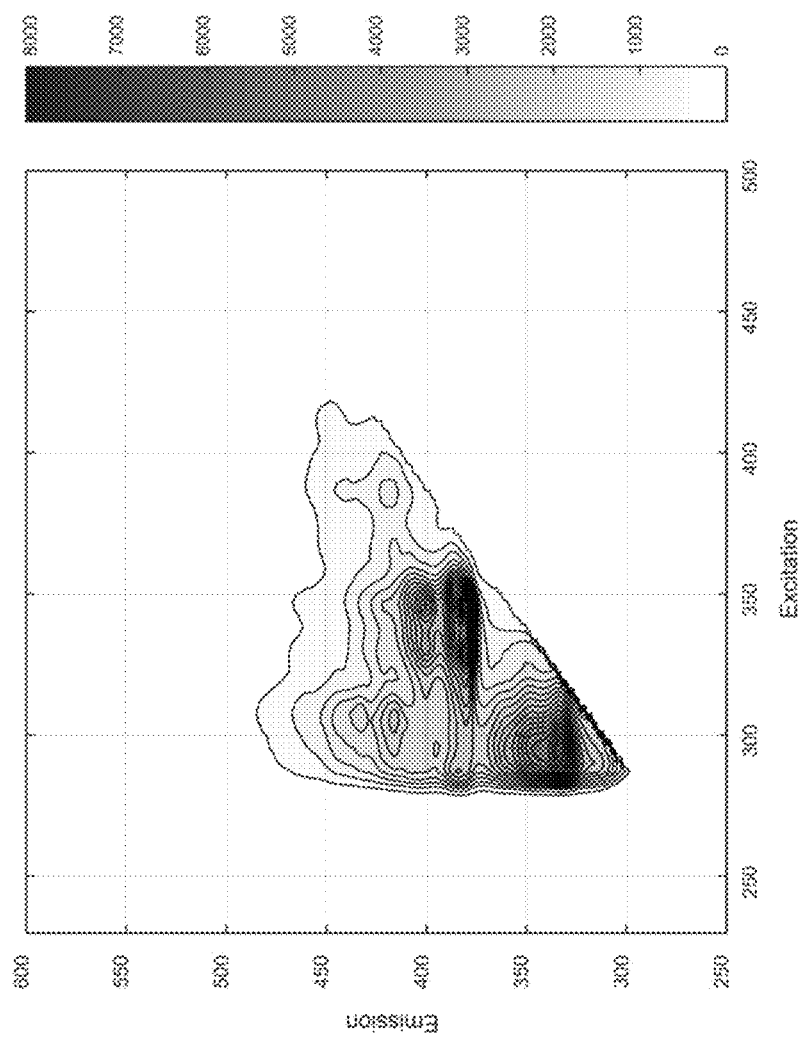
FIG. 6 shows an example of a measured fluorescence excitation-emission matrix spectrum for a lubricant base stock product.

FIG. 6 shows an example of fluorescence excitation-emission matrix spectrum obtained for a lubricant base stock sample (i.e., a lubricant or vacuum gas oil boiling range sample). As shown in FIG. 6, the spectrum includes various features, potentially indicating the presence of multiple types of aromatic compounds. Based on the boiling range, the various features likely indicate the presence of multiple types of polynuclear aromatic compounds. Instead of attempting to directly analyze a spectrum such as FIG. 6, a representation can be built of the spectrum in FIG. 6 using a linear combination of known spectra. In some aspects, the known spectra can correspond to individual compounds that optionally represent various aromatic compound classes. In other aspects, the known spectra can correspond to previously characterized samples that contain a mixture of aromatic compounds. In still other aspects, a library of known spectra can include both spectra for individual compounds (optionally representing compound classes) and spectra for samples that contain a mixture of aromatic compounds.

Figure 7:
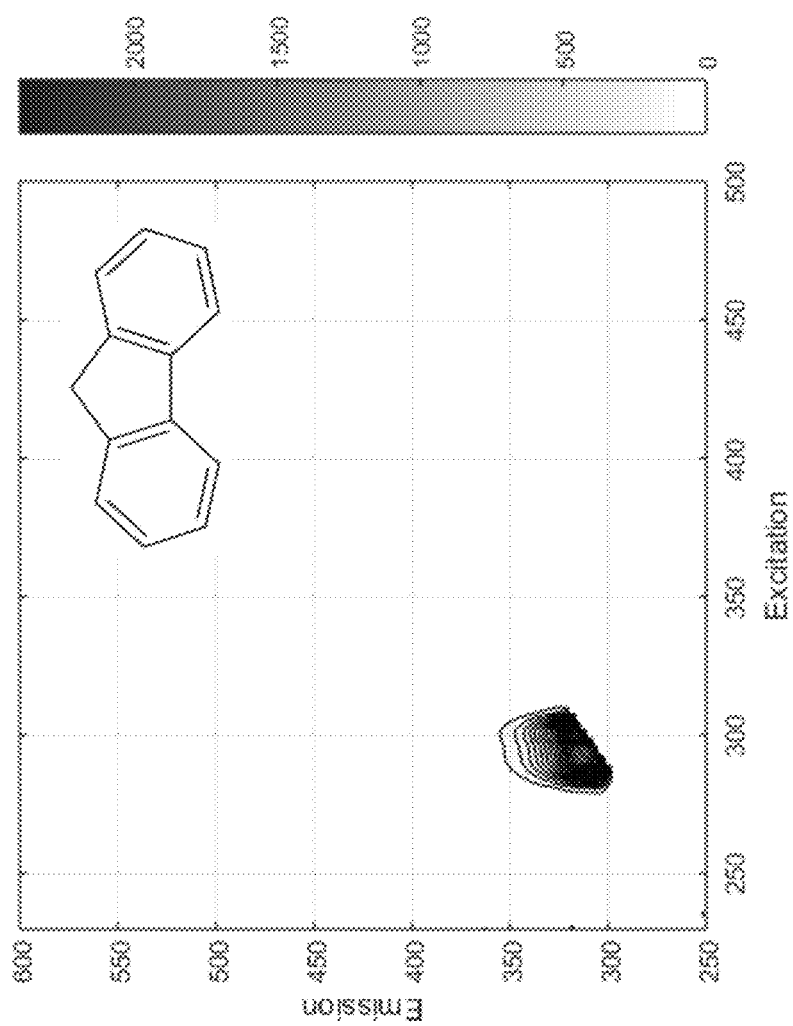
FIG. 7 shows an example of a compound class based on a 3-ring aromatic core.
Figure 8:
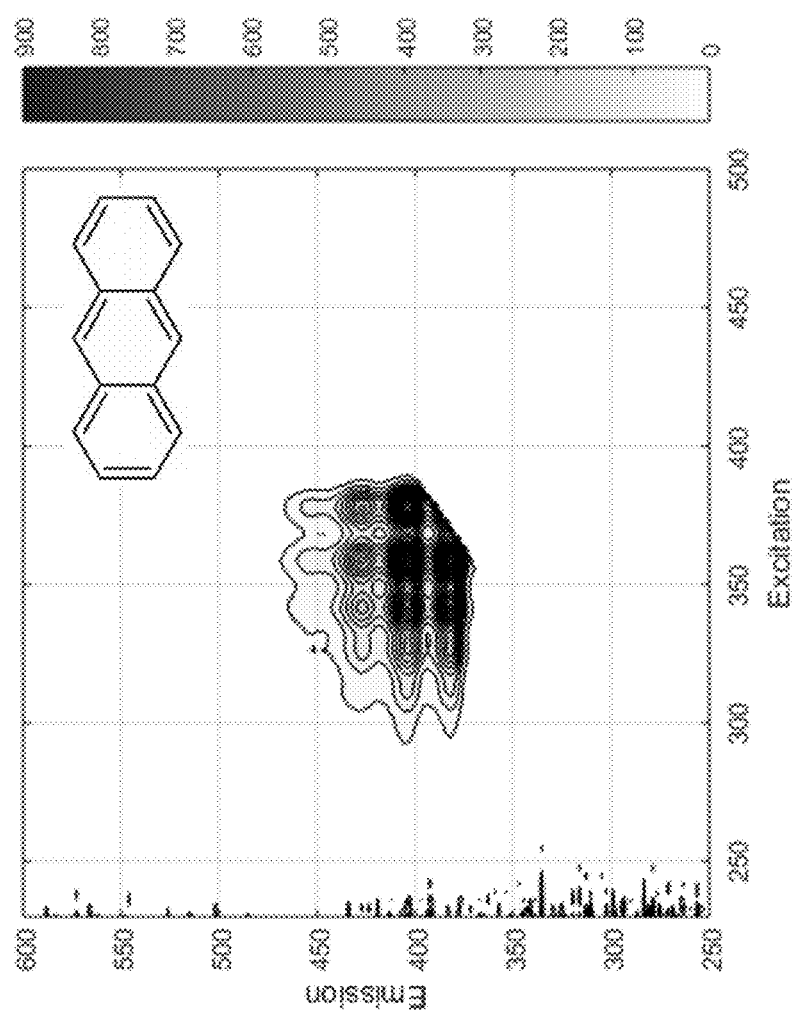
FIG. 8 shows another example of a compound class based on a 3-ring aromatic core.

In this example, a model compound library was constructed by obtaining spectra for individual compounds corresponding to various aromatic cores containing three or more rings as model compounds. FIGS. 7 and 8 show two polynuclear aromatic cores that include three rings in the aromatic core that were included in the model compound library for this example. FIG. 7 corresponds to fluorene, while FIG. 8 corresponds to anthracene. FIGS. 7 and 8 also include a corresponding fluorescence excitation-emission matrix spectrum for each model compound. As shown in FIGS. 7 and 8, the different compounds have distinct fluorescence spectra that can be used as part of a basis set for constructing a target spectrum from a library of reference compounds. In some aspects, model compounds such as those shown in FIGS. 7 and 8 correspond to compound classes. It is noted that the concentration of each model compound for generating the corresponding model spectrum can be different. One option can be to select the concentration of each model compound so as to provide a library of fluorescence spectra with comparable signal intensity. Another option can be to select the concentration for each model compound based on expected relative amounts in a sample. Still other options for selecting model compound concentrations can be used.

Figure 9:
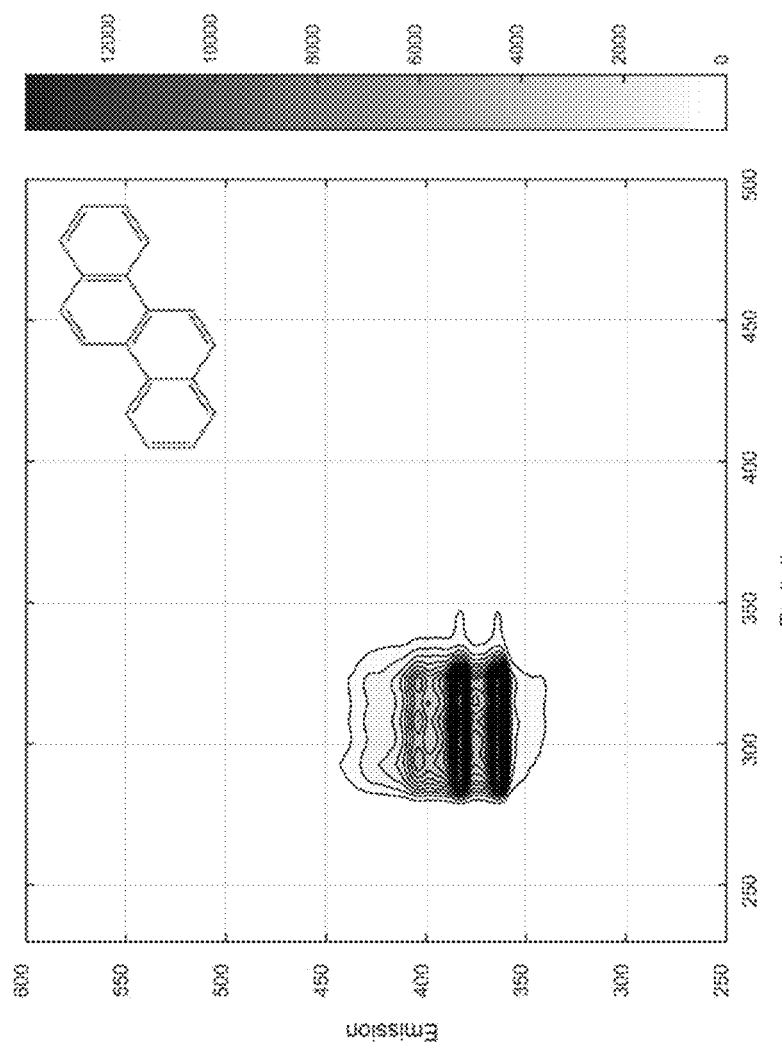
FIG. 9 shows an example of a compound class based on a 4-ring aromatic core.
Figure 10:
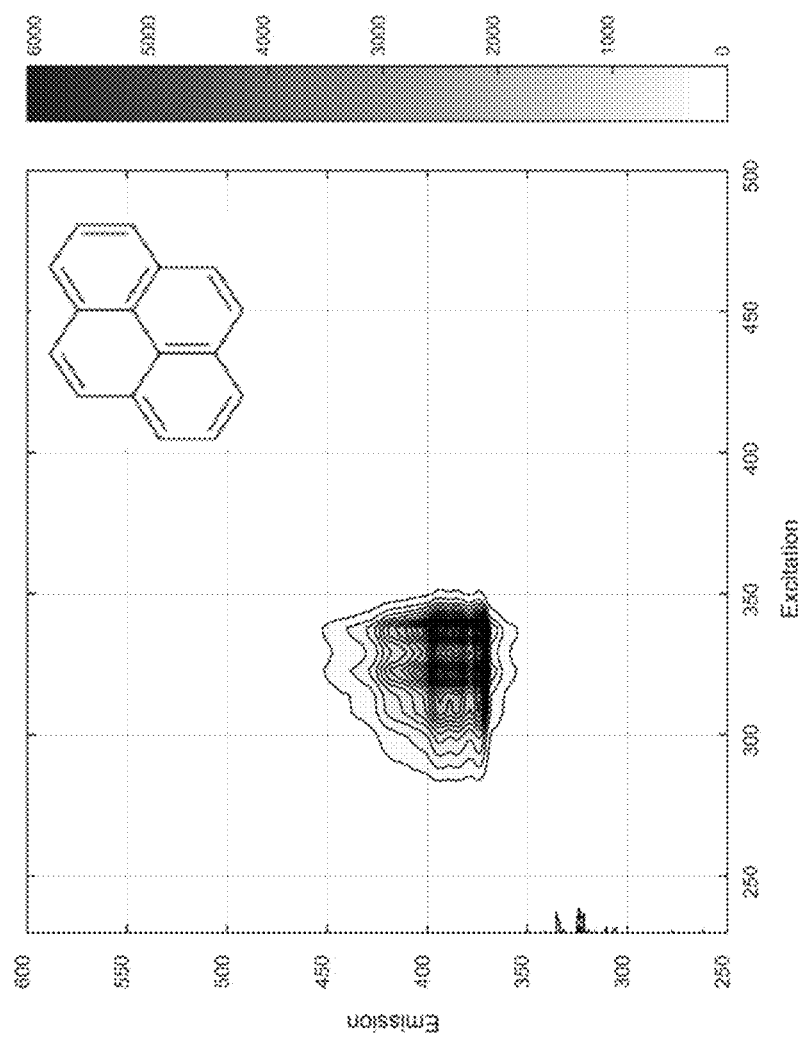
FIG. 10 shows another example of a compound class based on a 4-ring aromatic core.
Figure 11:
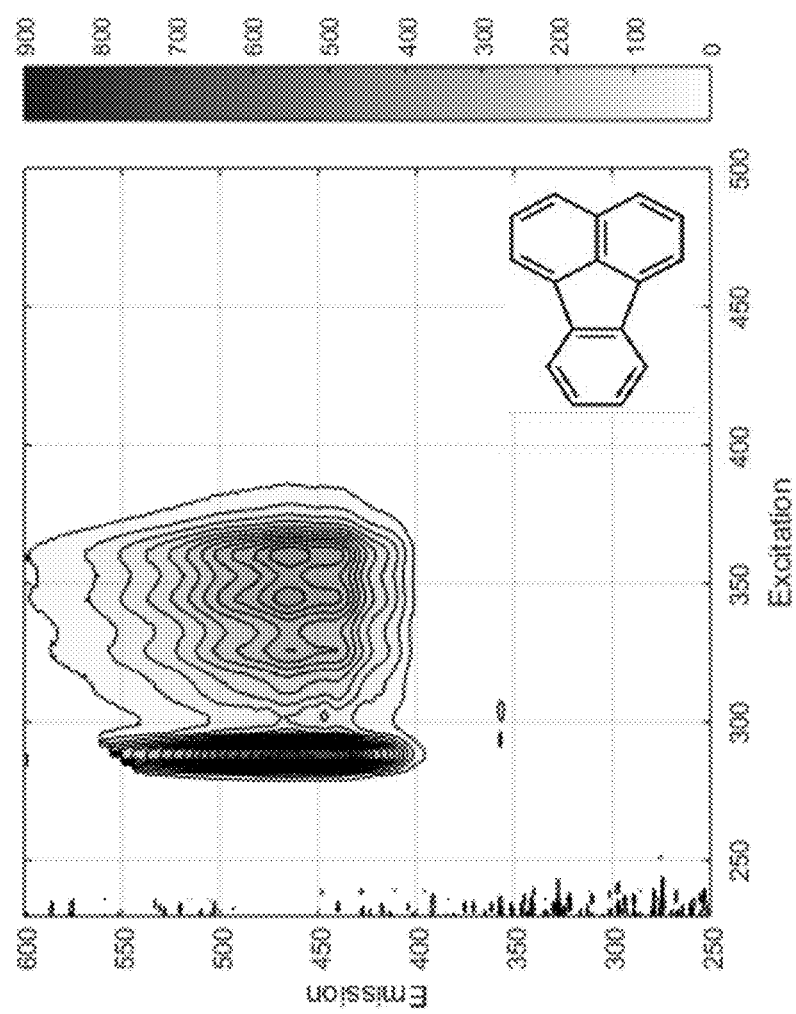
FIG. 11 shows another example of a compound class based on a 4-ring aromatic core.

Similar to FIGS. 7 and 8, FIGS. 9, 10, and 11 show polynuclear aromatic cores and corresponding spectra for three compounds and/or potential compound classes corresponding to four-ring aromatic core structures. FIG. 9 shows the structure and spectrum for chrysene. FIG. 10 shows the structure and spectrum for pyrene. FIG. 11 shows the structure and spectrum for fluoranthrene.

Figure 12:
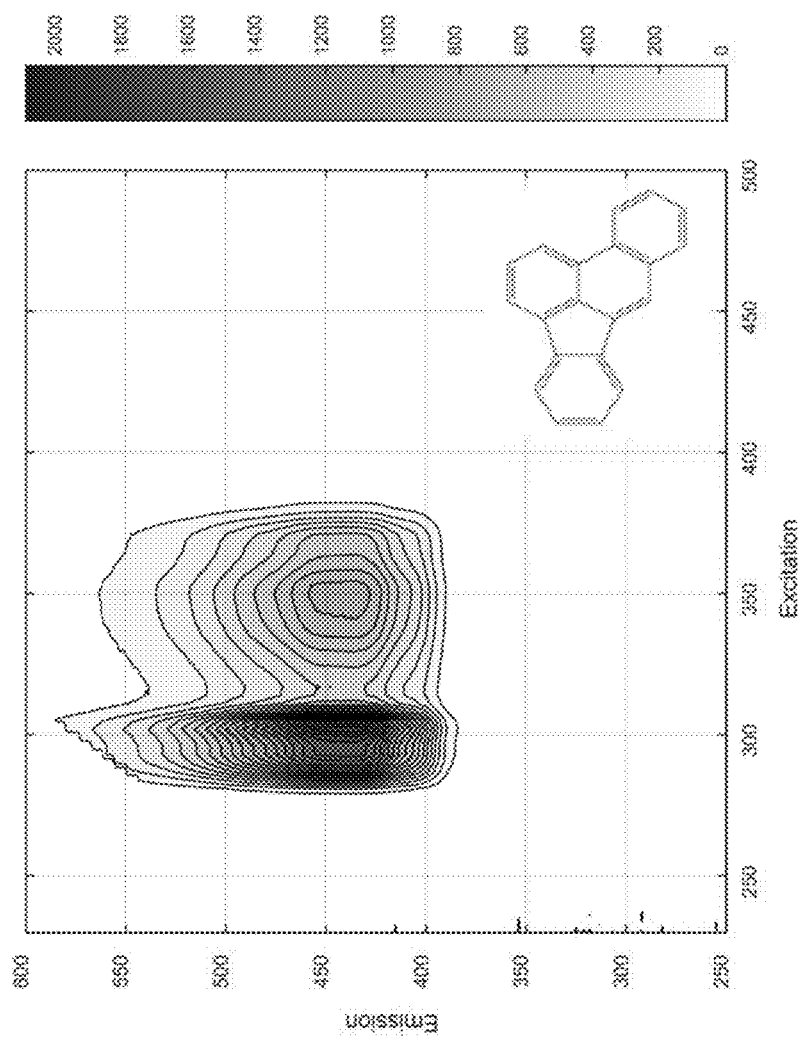
FIG. 12 shows an example of a compound class based on a 5-ring aromatic core.
Figure 13:
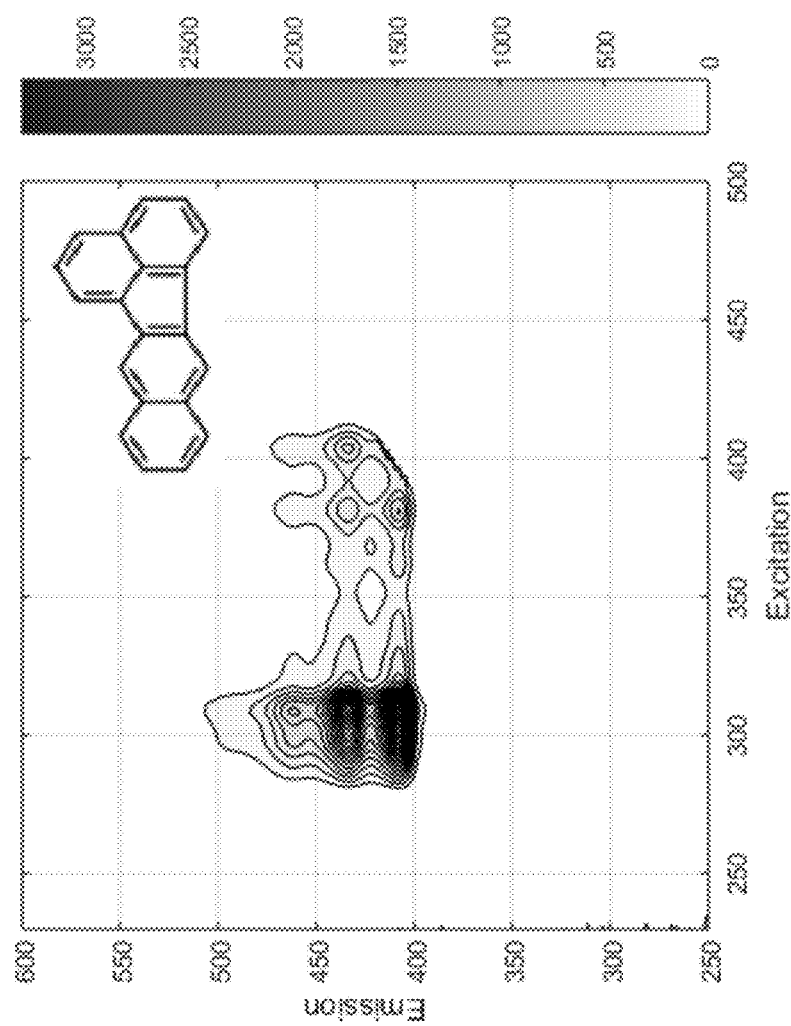
FIG. 13 shows another example of a compound class based on a 5-ring aromatic core.
Figure 14:
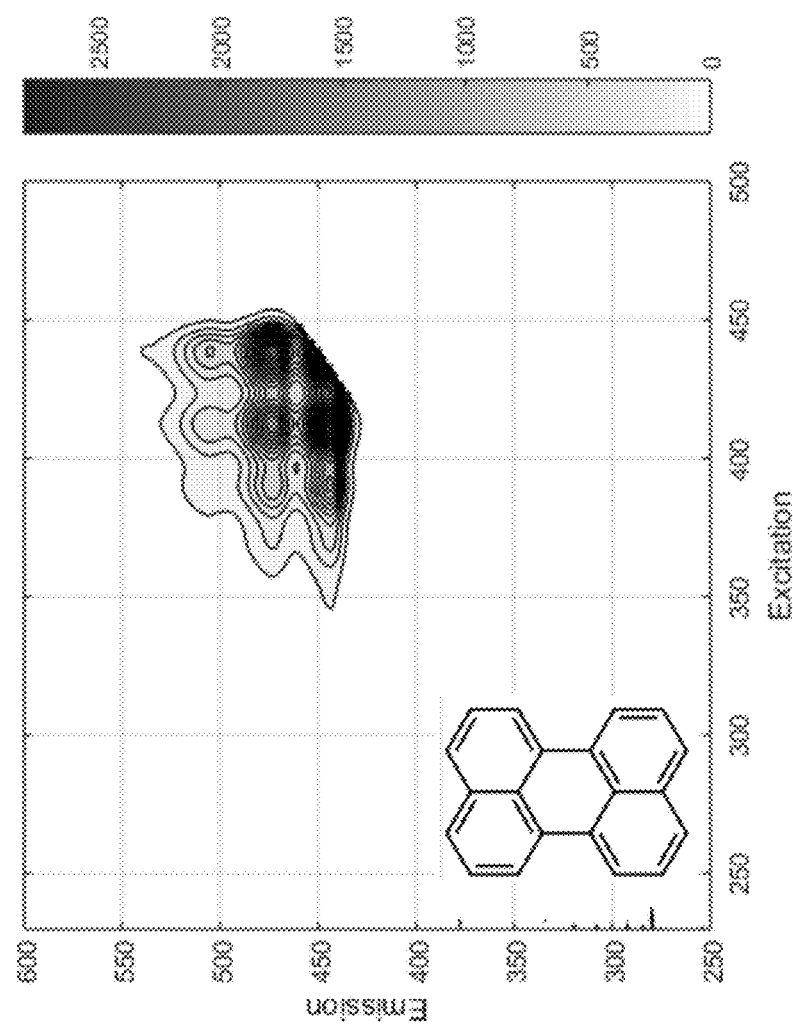
FIG. 14 shows another example of a compound class based on a 5-ring aromatic core.

FIGS. 12, 13, and 14 show polynuclear aromatic cores and corresponding spectra for three compounds and/or potential compound classes corresponding to five-ring aromatic core structures. FIG. 12 shows the structure and spectrum for benzo[b]fluoranthene, while FIG. 13 shows the structure and spectrum for benzo[k]fluoranthene. It is noted that even though the structures in 12 and 13 have some similarity, the fluorescence spectra are sufficiently distinct so that the different structures can be distinguished. FIG. 14 shows the structure and spectrum for perylene.

Figure 15:
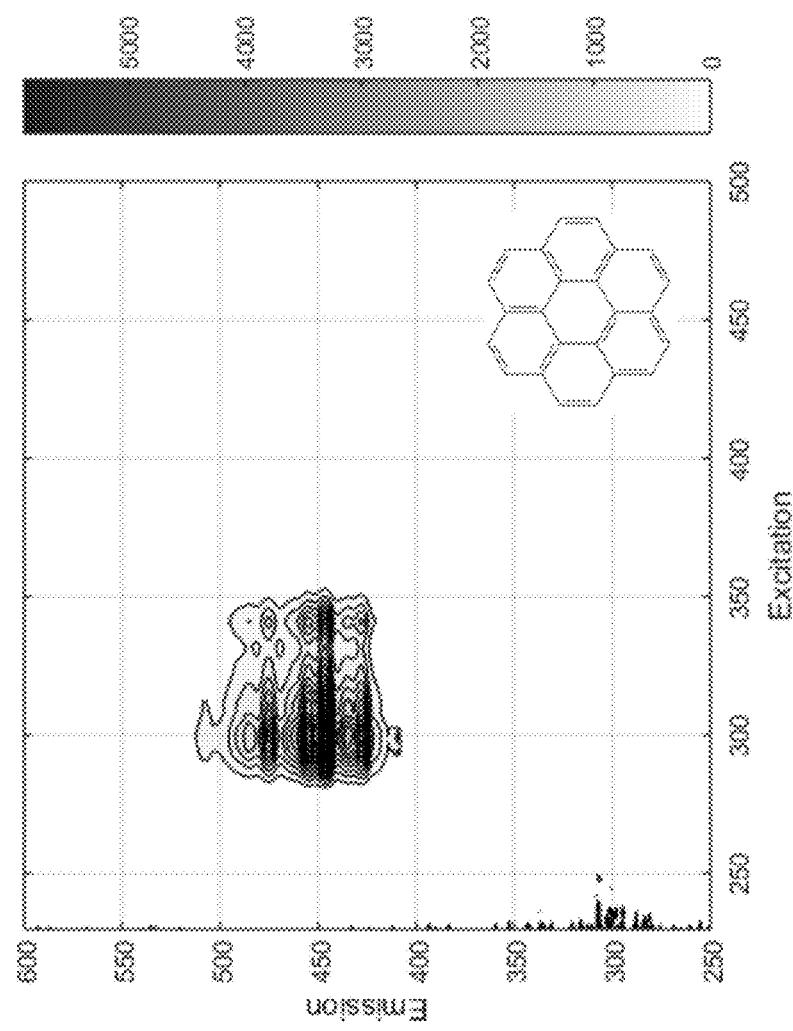
FIG. 15 shows an example of a compound class based on a 6+-ring aromatic core.
Figure 16:
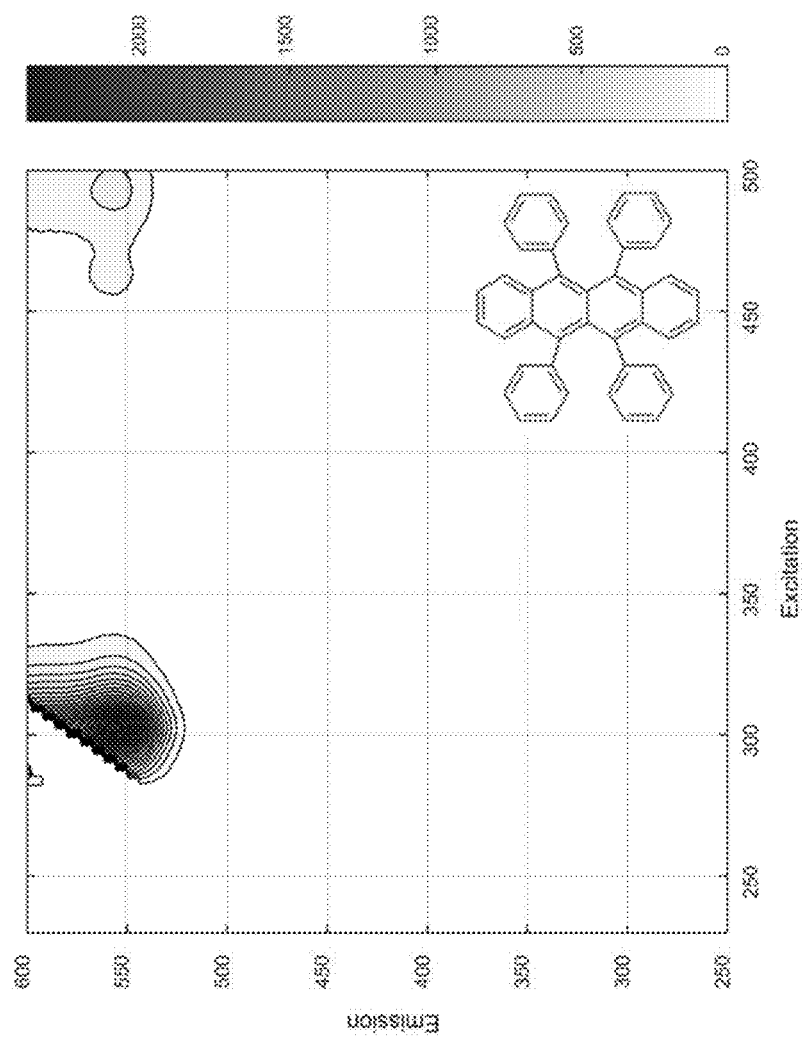
FIG. 16 shows another example of a compound class based on a 6+-ring aromatic core.

Any convenient number of compounds and/or mixtures of compounds can be included in a library. However, it is not necessary to include all potential types of ring structures in order to provide a suitable library. For example, FIG. 15 shows the structure and spectrum for coronene, a commonly encountered polynuclear aromatic in a processing environment for hydroprocessing of lubricant boiling range compounds. FIG. 16 shows the structure and spectrum for rubrene, which is less prevalent. In some aspects, a measured spectra can be fit using a model library that includes only a limited number of compounds and/or reference spectra.

After establishing a library of model compounds, the model compounds can be used to generate a representation of a spectrum. A least squares fit procedure is an example of a suitable procedure for determining a fit of a lubricant base stock spectra to the library of model compounds. During such a fit, the coefficients for each model compound can be constrained so that no negative coefficients are present. The fit can be performed without including a constraint on the value of the coefficients, so that the coefficients can be used to represent the concentration of a compound class in the sample.

Figure 17:
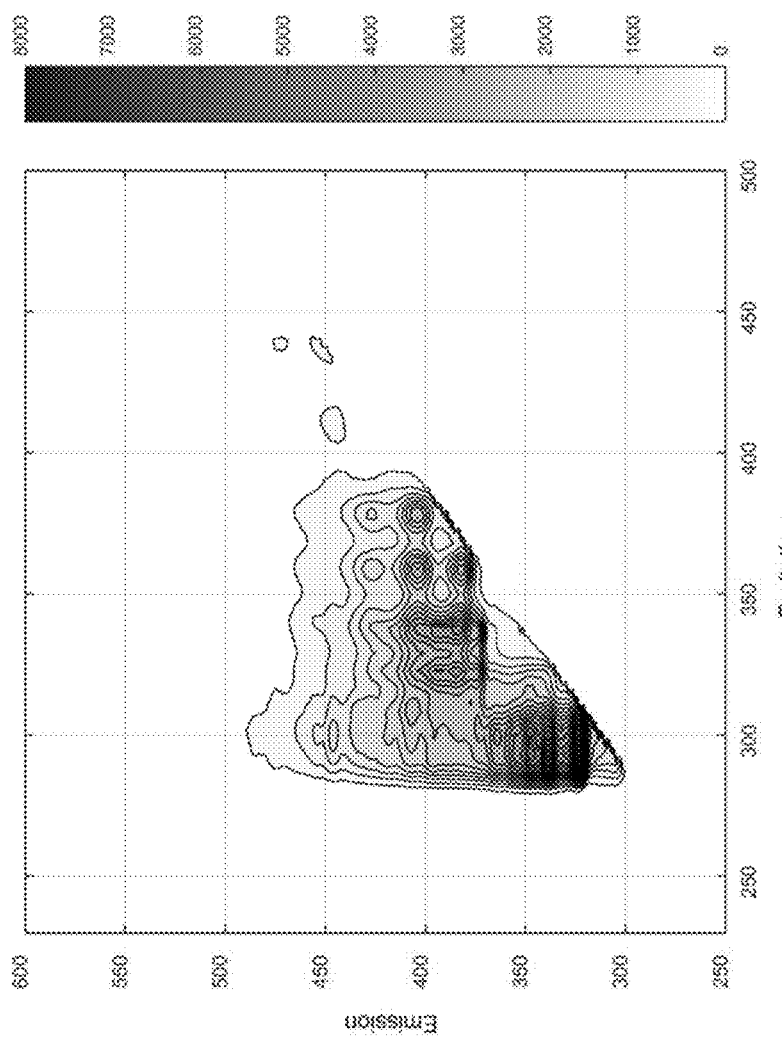
FIG. 17 shows an example of a fluorescence excitation-emission matrix spectrum generated based on a fit of spectra for a plurality of compound classes to the spectrum shown in FIG. 6.

FIG. 17 shows a calculated spectrum generated based on using a model compound library as a basis set. A least squares fit was performed to generate the representation. As shown in FIG. 17, the calculated spectrum based on the representation using the compound classes is substantially similar to the measured spectrum shown in FIG. 6.

As shown in FIG. 17, using model compounds to represent compound classes provided a way to build a model of the composition within a base stock sample. This model of the composition provides information about both the type and quantity of polynuclear aromatics present within a sample. This composition information can then be used to identify one or more process modifications that can reduce the polynuclear aromatics content.

As an example, the unsubstituted three-ring aromatic cores shown in FIGS. 7 and 8 have boiling points near or possibly below the lubricant boiling range. To the degree that three-ring aromatic cores are present, such compounds likely have additional alkyl substituents. Such compounds can either be either removed by cracking the alkyl chains (to drop the boiling point below lubricant range) or by aromatic saturation. Thus, an appropriate response to a high concentration of three-ring aromatic cores can be to increase conversion in a hydrotreating or hydrocracking stage, or to modify an aromatic saturation stage. As another example, coronene (shown in FIG. 15) is an aromatic core that is at or above the boiling range for lubricants without any substituents. Such cores are undesirable components in a lubricant base stock. At low concentration, such cores can be removed by an adsorbent. At higher concentrations, the presence of such cores suggests excessive creation of the cores due to high temperatures during processing. Thus, the correct response can depend on the concentration such a heavy aromatic core. If the amount of the heavy aromatic core is reasonable after hydroprocessing, but still too high after adsorption, then the appropriate adjustment can be to modify the adsorption conditions. If the amount of heavy aromatic core is too high after hydroprocessing due to high severity hydroprocessing conditions, the appropriate adjustment may be to replace catalyst in the hydroprocessing stage that requires the excessive temperatures.

Example—Characterization of Intermediate Effluent During Lubricant Base Stock Production The following is a prophetic example. In this example, a system similar to the system shown in FIG. 2 is used for lubricant base stock production. A spectrometer similar to the spectrometer shown in FIG. 4 is included within sour processing stage 620. The spectrometer is used to obtain fluorescence excitation-emission spectra of the effluent from sour processing stage 620 prior to separating the effluent to form higher boiling portion 625 and lower boiling portion 627. This corresponds to characterizing the intermediate product from sour stage processing.

During operation, an initial fluorescence excitation-emission matrix spectrum is obtained. If desired separate characterization can be performed on one or more of the final lubricant base stock products to determine that the initial spectrum corresponds to a product that satisfies one or more target product characteristics. A representation of the initial spectrum is made using model compound classes corresponding to various aromatic core structures form a model compound library. After generating the representation, subsequent fluorescence excitation-emission matrix spectra are obtained as lubricant base stock production continues. A fit quality for the representation is determined relative to the additional spectra. When the fit quality for an additional spectra relative to the representation falls below a threshold value the process severity in the sour stage can be increased. Alternatively, if the feedstock has been changed, the hydroprocessing conditions can be modified. After returning the process to a state where a desired product is formed, a new representation can be generated based on a new fluorescence excitation-emission matrix spectrum, to allow for further monitoring of the sour stage product.

Additional Embodiments

Embodiment 1. A method for making a hydroprocessed product, comprising: hydroprocessing a first portion of a feedstock under hydroprocessing conditions to form a hydroprocessed effluent comprising a plurality of aromatic compounds; performing fluorescence excitation-emission matrix spectroscopy on at least a portion of the hydroprocessed effluent to obtain a fluorescence excitation-emission matrix spectrum; generating a representation of the obtained fluorescence excitation-emission matrix spectrum based on a plurality of fluorescence reference spectra; hydroprocessing a second portion of the feedstock under the hydroprocessing conditions to form a second hydroprocessed effluent comprising a second plurality of aromatic compounds; performing fluorescence excitation-emission matrix spectroscopy on at least a portion of the second hydroprocessed effluent to obtain a second fluorescence excitation-emission matrix spectrum; and calculating a fit quality between at least a portion of the generated representation and the second fluorescence excitation-emission matrix spectrum, the plurality of aromatic compounds optionally comprising a plurality of polynuclear aromatic compounds.

Embodiment 2. A method for making a hydroprocessed product, comprising: hydroprocessing a feedstock under hydroprocessing conditions to form a hydroprocessed effluent comprising a plurality of aromatic compounds; performing fluorescence excitation-emission matrix spectroscopy on at least a portion of the hydroprocessed effluent to obtain a fluorescence excitation-emission matrix spectrum; generating a representation of the obtained fluorescence excitation-emission matrix spectrum based on a plurality of fluorescence reference spectra hydroprocessing a second feedstock under the hydroprocessing conditions to form a second hydroprocessed effluent comprising a second plurality of aromatic compounds; performing fluorescence excitation-emission matrix spectroscopy on at least a portion of the second hydroprocessed effluent to obtain a second fluorescence excitation-emission matrix spectrum; and calculating a fit quality between the generated representation and the second fluorescence excitation-emission matrix spectrum.

Embodiment 3. The method of any of the above embodiments, further comprising performing an action responsive to determining that the calculated fit quality is below a threshold quality value, the responsive action optionally comprising increasing a severity of the hydroprocessing conditions responsive to determining that the calculated fit quality is below a threshold quality value.

Embodiment 4. A method for making a hydroprocessed product, comprising: hydroprocessing a portion of a first feedstock under hydroprocessing conditions to form a hydroprocessed effluent comprising a plurality of aromatic compounds; performing fluorescence excitation-emission matrix spectroscopy on at least a portion of the hydroprocessed effluent to obtain a fluorescence excitation-emission matrix spectrum calculating a quantity of aromatics for one or more fluorescence compound classes based on the obtained fluorescence excitation-emission matrix spectrum; and modifying the hydroprocessing conditions based on the calculated quantity of aromatics for at least one of the one or more fluorescence compound classes.

Embodiment 5. The method of any of the above embodiments, wherein the plurality of fluorescence reference spectra comprise i) a plurality of spectra corresponding to a plurality of fluorescence compound classes, ii) a plurality of spectra corresponding to previously characterized samples comprising a plurality of aromatic compound classes, or iii) a combination of i) and ii).

Embodiment 6. The method of Embodiment 5, the method further comprising: calculating a quantity of aromatics for one or more fluorescence compound classes based on the obtained fluorescence excitation-emission matrix spectrum; and modifying the hydroprocessing conditions based on the calculated quantity of aromatics for at least one of the one or more fluorescence compound classes.

Embodiment 7. The method of Embodiment 5 or 6, wherein the plurality of fluorescence compound classes correspond to compound classes based on Z-class, or wherein the plurality of fluorescence compound classes correspond to compound classes based on hydrogen deficiency relative to the number of carbons, or wherein the plurality of fluorescence compound classes correspond to compound classes based on aromatic core ring structures, or a combination thereof.

Embodiment 8. The method of any of the above embodiments, wherein calculating a fit quality between at least a portion of the generated representation and the second fluorescence excitation-emission matrix spectrum comprises: selecting a portion of the generated representation based on a boiling point range; and calculating a fit quality between the selected portion of the generated representation and a corresponding portion of the second fluorescence excitation-emission matrix spectrum.

Embodiment 9. The method of any of the above embodiments, wherein the at least a portion of the hydroprocessed effluent comprises a lubricant boiling range portion of the hydroprocessed effluent, or wherein the at least a portion of the hydroprocessed effluent comprises a T5 distillation point of 340° C. or more and a T95 distillation point of 566° C. or less.

Embodiment 10. The method of any of the above embodiments, the method further comprising exposing at least an aromatic-containing portion of the hydroprocessed effluent to an adsorbent under aromatic adsorption conditions to form an adsorbent effluent, the at least a portion of the hydroprocessed effluent comprising at least a portion of the adsorbent effluent, the adsorbent optionally comprising one or more of activated carbon, hydroxyl-modified activated carbon, attapulgus clay, an adsorbent clay, silica or alumina with greater than 10 $m^2$/g BET surface area, porous polymer, porous resin, diatomaceous earth, and zeolite.

Embodiment 11. The method of Embodiment 10, further comprising increasing a severity of the aromatic adsorption conditions responsive to determining that the calculated fit quality comparison is below a threshold quality value.

Embodiment 12. The method of any of the above embodiments, wherein the hydroprocessed effluent comprises 50 wppm to 500 wppm of sulfur; or wherein the hydroprocessed effluent comprises 100 wppm or more of sulfur; or wherein the hydroprocessed effluent comprises 5 wppm or less of sulfur.

Embodiment 13. The method of any of the above embodiments, wherein hydroprocessing a first portion of a feedstock under hydroprocessing conditions comprises: hydroprocessing the first portion of the feedstock under first stage hydroprocessing conditions to form a first stage hydroprocessed effluent, the first stage hydroprocessed effluent comprising a sulfur content of 300 wppm or less, a nitrogen content of 100 wppm or less, or a combination thereof; separating, from the first hydroprocessed effluent, at least a fuels boiling range fraction and an intermediate lubricant boiling range fraction; and hydroprocessing at least a portion of the lubricant boiling range fraction under second hydroprocessing conditions, the second hydroprocessing conditions comprising catalytic dewaxing conditions, to form a twice-hydroprocessed effluent comprising a 370° C.+ portion having a first kinematic viscosity at 100° C., wherein the at least a portion of the hydroprocessed effluent comprises at least a portion of the intermediate lubricant boiling fraction, at least a portion of the twice-hydroprocessed effluent, or a combination thereof.

Embodiment 14. The method of any of the above embodiments, wherein the hydroprocessing conditions comprise hydrotreating conditions, hydrocracking conditions, or a combination thereof, and wherein modifying the hydroprocessing conditions comprises modifying at least one of a temperature and a space velocity of the hydrotreating conditions, the hydrocracking conditions, or the combination thereof.

Embodiment 15. The method of any of the above embodiments, wherein the feedstock comprises an aromatics content of 60 wt % or more, or wherein the feedstock comprises a deasphalted oil, or a combination thereof.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for making a hydroprocessed product, comprising:
hydroprocessing a first portion of a feedstock under hydroprocessing conditions to form a hydroprocessed effluent comprising a plurality of aromatic compounds;
performing fluorescence excitation-emission matrix spectroscopy on at least a portion of the hydroprocessed effluent to obtain a fluorescence excitation-emission matrix spectrum;
generating a representation of the obtained fluorescence excitation-emission matrix spectrum based on a plurality of fluorescence reference spectra;
hydroprocessing a second portion of the feedstock under the hydroprocessing conditions to form a second hydroprocessed effluent comprising a second plurality of aromatic compounds;
performing fluorescence excitation-emission matrix spectroscopy on at least a portion of the second hydroprocessed effluent to obtain a second fluorescence excitation-emission matrix spectrum; and
calculating a fit quality between at least a portion of the generated representation and the second fluorescence excitation-emission matrix spectrum.

2. The method of claim 1, further comprising performing an action responsive to determining that the calculated fit quality is below a threshold quality value.

3. The method of claim 1, further comprising increasing a severity of the hydroprocessing conditions responsive to determining that the calculated fit quality is below a threshold quality value.

4. The method of claim 1, wherein the plurality of fluorescence reference spectra comprise i) a plurality of spectra corresponding to a plurality of fluorescence compound classes, ii) a plurality of spectra corresponding to a plurality of previously characterized samples, each previously characterized sample comprising a plurality of fluorescence compound classes, or iii) a combination of i) and ii).

5. The method of claim 4, the method further comprising:
calculating a quantity of aromatics for one or more fluorescence compound classes based on the obtained fluorescence excitation-emission matrix spectrum; and
modifying the hydroprocessing conditions based on the calculated quantity of aromatics for at least one of the one or more fluorescence compound classes.

6. The method of claim 4, wherein the plurality of fluorescence compound classes correspond to compound classes based on Z-class, or wherein the plurality of fluorescence compound classes correspond to compound classes based on hydrogen deficiency relative to the number of carbons, or wherein the plurality of fluorescence compound classes correspond to compound classes based on aromatic core ring structures, or a combination thereof.

7. The method of claim 1, wherein calculating a fit quality between at least a portion of the generated representation and the second fluorescence excitation-emission matrix spectrum comprises:
selecting a portion of the generated representation based on a boiling point range; and
calculating a fit quality between the selected portion of the generated representation and a corresponding portion of the second fluorescence excitation-emission matrix spectrum.

8. The method of claim 1, wherein the at least a portion of the hydroprocessed effluent comprises a lubricant boiling range portion of the hydroprocessed effluent, or wherein the at least a portion of the hydroprocessed effluent comprises a T5 distillation point of 340° C. or more and a T95 distillation point of 566° C. or less.

9. The method of claim 1, the method further comprising exposing at least an aromatic-containing portion of the hydroprocessed effluent to an adsorbent under aromatic adsorption conditions to form an adsorbent effluent, the at least a portion of the hydroprocessed effluent comprising at least a portion of the adsorbent effluent.

10. The method of claim 9, further comprising increasing a severity of the aromatic adsorption conditions responsive to determining that the calculated fit quality comparison is below a threshold quality value.

11. The method of claim 9, wherein the adsorbent comprises one or more of activated carbon, hydroxyl-modified activated carbon, attapulgus clay, an adsorbent clay, silica or alumina with greater than 10 $m^2/g$ BET surface area, porous polymer, porous resin, diatomaceous earth, and zeolite.

12. The method of claim 1, wherein the hydroprocessed effluent comprises 50 wppm to 500 wppm of sulfur; or wherein the hydroprocessed effluent comprises 100 wppm or more of sulfur; or wherein the hydroprocessed effluent comprises 5 wppm or less of sulfur.

13. The method of claim 1, wherein the plurality of aromatic compounds comprises a plurality of polynuclear aromatic compounds.

14. The method of claim 1, wherein hydroprocessing a first portion of a feedstock under hydroprocessing conditions comprises:
- hydroprocessing the first portion of the feedstock under first stage hydroprocessing conditions to form a first stage hydroprocessed effluent, the first stage hydroprocessed effluent comprising a sulfur content of 300 wppm or less, a nitrogen content of 100 wppm or less, or a combination thereof;
- separating, from the first hydroprocessed effluent, at least a fuels boiling range fraction and an intermediate lubricant boiling range fraction; and
- hydroprocessing at least a portion of the lubricant boiling range fraction under second hydroprocessing conditions, the second hydroprocessing conditions comprising catalytic dewaxing conditions, to form a twice-hydroprocessed effluent comprising a 370° C.+ portion having a first kinematic viscosity at 100° C.,
- wherein the at least a portion of the hydroprocessed effluent comprises at least a portion of the intermediate lubricant boiling fraction, at least a portion of the twice-hydroprocessed effluent, or a combination thereof.

15. The method of claim 1, wherein the hydroprocessing conditions comprise hydrotreating conditions, hydrocracking conditions, or a combination thereof, and
- wherein modifying the hydroprocessing conditions comprises modifying at least one of a temperature and a space velocity of the hydrotreating conditions, the hydrocracking conditions, or the combination thereof.

16. The method of claim 1, wherein the feedstock comprises an aromatics content of 60 wt % or more, or wherein the feedstock comprises a deasphalted oil, or a combination thereof.

17. A method for making a hydroprocessed product, comprising:
- hydroprocessing a portion of a first feedstock under hydroprocessing conditions to form a hydroprocessed effluent comprising a plurality of aromatic compounds;
- performing fluorescence excitation-emission matrix spectroscopy on at least a portion of the hydroprocessed effluent to obtain a fluorescence excitation-emission matrix spectrum;
- calculating a quantity of aromatics for one or more fluorescence compound classes based on the obtained fluorescence excitation-emission matrix spectrum; and
- modifying the hydroprocessing conditions based on the calculated quantity of aromatics for at least one of the one or more fluorescence compound classes.

18. The method of claim 17, wherein the plurality of fluorescence compound classes correspond to compound classes based on Z-class, or wherein the plurality of fluorescence compound classes correspond to compound classes based on hydrogen deficiency relative to the number of carbons, or wherein the plurality of fluorescence compound classes correspond to compound classes based on aromatic core ring structures, or a combination thereof.

19. A method for making a hydroprocessed product, comprising:
- hydroprocessing a feedstock under hydroprocessing conditions to form a hydroprocessed effluent comprising a plurality of aromatic compounds;
- performing fluorescence excitation-emission matrix spectroscopy on at least a portion of the hydroprocessed effluent to obtain a fluorescence excitation-emission matrix spectrum;
- generating a representation of the obtained fluorescence excitation-emission matrix spectrum based on a plurality of fluorescence reference spectra;
- hydroprocessing a second feedstock under the hydroprocessing conditions to form a second hydroprocessed effluent comprising a second plurality of aromatic compounds;
- performing fluorescence excitation-emission matrix spectroscopy on at least a portion of the second hydroprocessed effluent to obtain a second fluorescence excitation-emission matrix spectrum; and
- calculating a fit quality between the generated representation and the second fluorescence excitation-emission matrix spectrum.

20. The method of claim 19, the method further comprising exposing at least an aromatic-containing portion of the hydroprocessed effluent to an adsorbent under aromatic adsorbent conditions to form an adsorbent effluent, the at least a portion of the hydroprocessed effluent comprising at least a portion of the adsorbent effluent.

21. The method of claim 19, wherein the plurality of aromatic compounds comprises a plurality of polyaromatic compounds.

22. The method of claim 19, wherein the plurality of fluorescence reference spectra comprise i) a plurality of spectra corresponding to a plurality of fluorescence compound classes, ii) a plurality of spectra corresponding to a plurality of previously characterized samples, each previously characterized sample comprising a plurality of fluorescence compound classes, or iii) a combination of i) and ii).

23. The method of claim 22, wherein the plurality of fluorescence compound classes correspond to compound classes based on Z-class, or wherein the plurality of fluorescence compound classes correspond to compound classes based on hydrogen deficiency relative to the number of carbons, or wherein the plurality of fluorescence compound classes correspond to compound classes based on aromatic core ring structures, or a combination thereof.

24. The method of claim 19, wherein calculating a fit quality between at least a portion of the generated representation and the second fluorescence excitation-emission matrix spectrum comprises:
- selecting a portion of the generated representation based on a boiling point range; and
- calculating a fit quality between the selected portion of the generated representation and a corresponding portion of the second fluorescence excitation-emission matrix spectrum.

* * * * *